US011098626B2

(12) United States Patent
Matsumoto

(10) Patent No.: US 11,098,626 B2
(45) Date of Patent: Aug. 24, 2021

(54) FLUID INJECTION DEVICE AND FLUID INJECTION SYSTEM

(71) Applicant: DENSO CORPORATION, Kariya (JP)

(72) Inventor: Shuichi Matsumoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/843,190

(22) Filed: Apr. 8, 2020

(65) Prior Publication Data

US 2020/0332693 A1 Oct. 22, 2020

(30) Foreign Application Priority Data

Apr. 22, 2019 (JP) .............................. JP2019-081216

(51) Int. Cl.
| | |
|---|---|
| *F01N 3/20* | (2006.01) |
| *B60K 15/03* | (2006.01) |
| *F02M 55/02* | (2006.01) |
| *F02M 37/00* | (2006.01) |
| *B01D 53/94* | (2006.01) |
| *F02M 63/02* | (2006.01) |

(52) U.S. Cl.
CPC ....... *F01N 3/2066* (2013.01); *B01D 53/9431* (2013.01); *B60K 15/03* (2013.01); *F02M 37/0052* (2013.01); *F02M 55/025* (2013.01); *F02M 63/0275* (2013.01); *F01N 2610/02* (2013.01); *F01N 2610/03* (2013.01); *F01N 2610/1453* (2013.01)

(58) Field of Classification Search
CPC combination set(s) only.
See application file for complete search history.

(56) References Cited

U.S. PATENT DOCUMENTS 5,577,666 A * 11/1996 Shen .................... F02M 69/047
239/290
6,192,677 B1 * 2/2001 Tost ................... B01D 53/9431
60/286

(Continued)

FOREIGN PATENT DOCUMENTS

| DE | 10 2011 107609 | 1/2013 |
| EP | 2 722 504 | 5/2017 |
| EP | 3 181 847 | 6/2017 |

*Primary Examiner* — Binh Q Tran
(74) *Attorney, Agent, or Firm* — Nixon & Vanderhye P.C.

(57) ABSTRACT

A fluid injection device includes a valve body of a cylindrical shape and a valve member, which is movably accommodated in the valve body and which has a valve surface portion to be seated on or separated from a valve seat portion formed in an inside of the valve body. The valve member has an inside passage through which urea aqueous solution flows and a communication port, which is opened at an outer peripheral surface of the valve member and at a position of an upstream side of the valve surface portion in a flow direction of air. An annular fluid passage, through which the air flows, is formed between an inner peripheral surface of the valve body and the outer peripheral surface of the valve member. The communication port is connected to the annular fluid passage at a connecting passage portion. A cross-sectional passage area of the annular fluid passage at the connecting passage portion is smaller than a cross-sectional passage area of the annular fluid passage at an upstream-side passage portion thereof.

19 Claims, 11 Drawing Sheets

(56) References Cited

U.S. PATENT DOCUMENTS

| | | | |
|---|---|---|---|
| 6,279,603 B1 * | 8/2001 | Czarnik | F01N 3/2066 |
| | | | 137/339 |
| 6,526,746 B1 * | 3/2003 | Wu | F01N 3/36 |
| | | | 60/286 |
| 9,309,848 B2 * | 4/2016 | Prociw | F02M 53/08 |
| 2010/0319322 A1 | 12/2010 | Hüthwohl | |
| 2011/0126529 A1 * | 6/2011 | Park | F01N 3/2066 |
| | | | 60/303 |
| 2014/0069084 A1 | 3/2014 | Huthwohl | |
| 2016/0108838 A1 * | 4/2016 | Inoue | B05B 7/0815 |
| | | | 701/115 |

\* cited by examiner

FLUID INJECTION DEVICE AND FLUID INJECTION SYSTEM

CROSS REFERENCE TO RELATED APPLICATION

This application is based on Japanese Patent Application No. 2019-081216 filed on Apr. 22, 2019, the disclosure of which is incorporated herein by reference.

FIELD OF TECHNOLOGY

The present disclosure relates to a fluid injection device and a fluid injection system for an automotive vehicle.

BACKGROUND

An SCR (Selective Catalytic Reduction) system is known in the art as one of exhaust gas purifying systems for purifying nitrogen oxides (NOx) contained in exhaust gas emitted from an internal combustion engine of an automotive vehicle. The SCR system includes a liquid injection valve (an urea addition valve) provided in an exhaust pipe of the automotive vehicle and a selective reduction catalyst provided in the exhaust pipe at a downstream side of the urea addition valve. In the SCR system, liquid (for example, urea aqueous solution) injected into the exhaust pipe is hydrolyzed to ammonia by heat of the exhaust gas. When the exhaust gas including the ammonia flows into the selective reduction catalyst, the nitrogen oxides (NOx) is reduced to nitrogen and water with the ammonia as reducing agent.

For example, the fluid injection system includes an injection device provided in an exhaust pipe of an automotive vehicle, a pump for supplying urea aqueous solution from a tank to the injection device, and a compressed air supply unit for supplying air to the injection device. In the fluid injection system, the urea aqueous solution and the air are mixed with each other and injected from the injection device, to thereby atomize the urea aqueous solution.

The fluid injection system may become complicated when providing the injection device having the above structure for atomizing the urea aqueous solution with the air, which is similar to the fluid injection system of the above prior art.

The problem that the fluid injection system may become complicated is a common problem not only for the fluid injection system for atomizing the urea aqueous solution with the air but also for such a fluid injection system or a fluid injection device for atomizing any optional fluid with any optional gas.

SUMMARY OF THE DISCLOSURE

The present disclosure is made in view of the above problem. It is an object of the present disclosure to provide a fluid injection device and a fluid injection system, which has a structure for atomizing fluid and injecting the same and which makes it possible to simplify the structure.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION OF THE EMBODIMENTS

Figure 1:
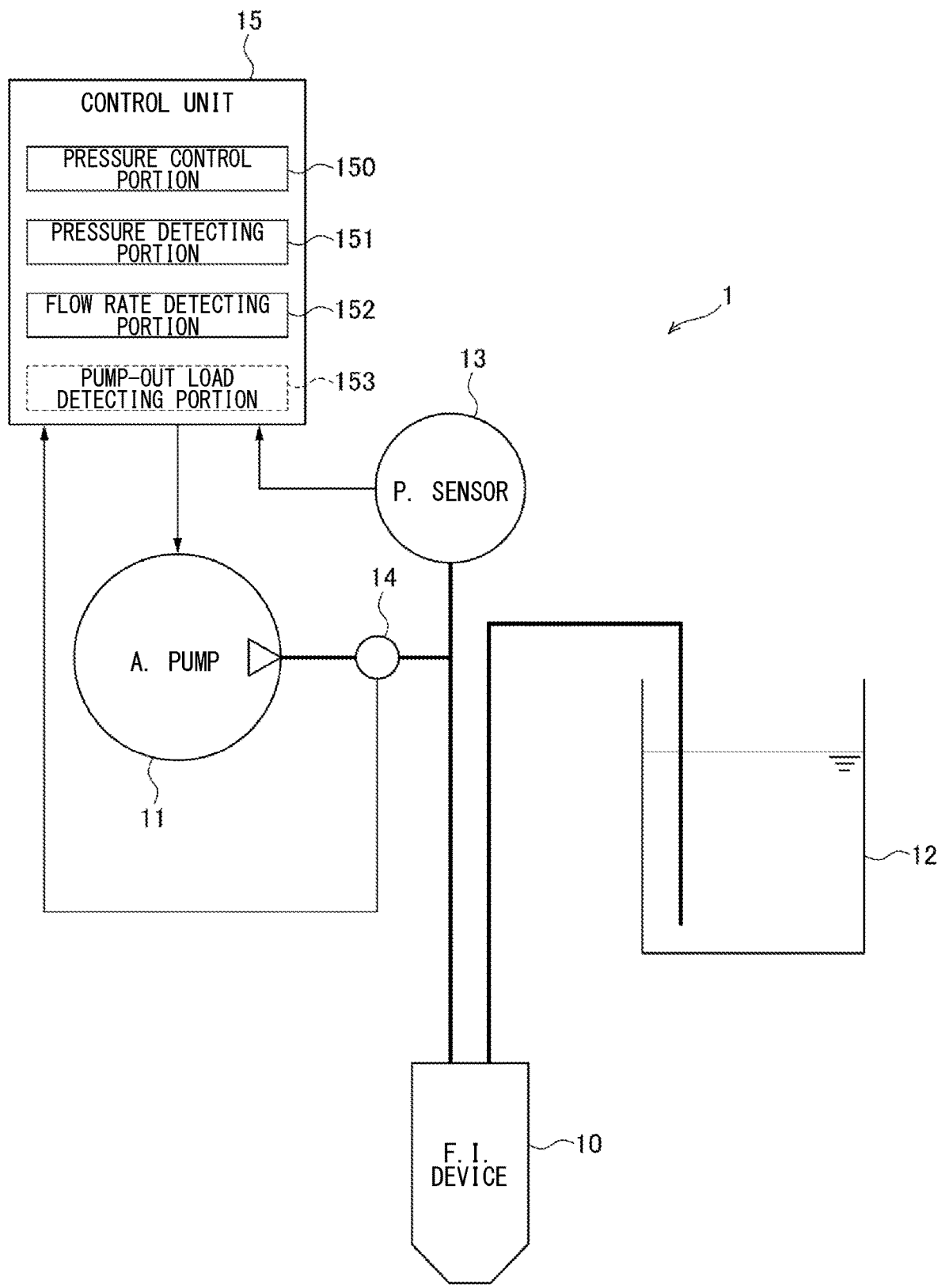
FIG. 1 is a block diagram showing an outline of a fluid injection system according to a first embodiment of the present disclosure.

The present disclosure will be explained hereinafter by way of multiple embodiments and/or modifications with reference to the drawings. The same reference numerals are given to the same or similar structures and/or portions in order to avoid repeated explanation.

First Embodiment

At first, an outline of a fluid injection system 1 having a fluid injection device 10 of a first embodiment of the present disclosure will be explained. The fluid injection system 1 shown in FIG. 1 is applied to an SCR (Selective Catalytic Reduction) system of an automotive vehicle (hereinafter, the vehicle) for adding liquid (for example, urea aqueous solution) to exhaust gas flowing through an exhaust pipe of the vehicle having an internal combustion engine (hereinafter, the engine). The fluid injection system 1 includes the fluid injection device 10, an air pump 11, a liquid tank 12, a pressure sensor 13, a flow rate sensor 14, an electronic control unit 15 (hereinafter, the ECU 15) and so on.

The air pump 11 pressurizes gas (the air in the present embodiment) to a predetermined value necessary for injection and supplies such pressurized gas to the fluid injection device 10. In the present embodiment, the air pump 11 works as a gas supply unit for regulating pressure of the gas and suppling such pressure-regulated gas to the fluid injection device 10. In addition to the gas (the air) from the air pump 11, the liquid (the urea aqueous solution) is supplied from the liquid tank 12, which stores the urea aqueous solution. The fluid injection device 10 atomizes the urea aqueous solution from the liquid tank 12 by the air from the air pump 11 and injects such atomized fluid into the exhaust pipe of the vehicle. The fluid injection device 10 is used as a urea addition valve for adding the urea aqueous solution to exhaust gas flowing through the exhaust pipe.

The pressure sensor 13 detects the pressure of the air supplied from the air pump 11 to the fluid injection device 10 and outputs an electric signal depending on a detected pressure of the air. The flow rate sensor 14 detects a flow rate of the air supplied from the air pump 11 to the fluid injection device 10 and outputs an electric signal depending on a detected flow rate of the air. Each of the electric signals of the pressure sensor 13 and the flow rate sensor 14 is transmitted to the ECU 15.

The ECU 15 is composed of a micro-computer having CPU, memory devices and so on. The ECU 15 detects the pressure and the flow rate of the air supplied to the fluid injection device 10 based on respective output signals of the pressure sensor 13 and the flow rate sensor 14. The ECU 15 controls an operation of the air pump 11 in accordance with the detected pressure and flow rate of the air.

A structure of the fluid injection device 10 will be explained.

Figure 2:
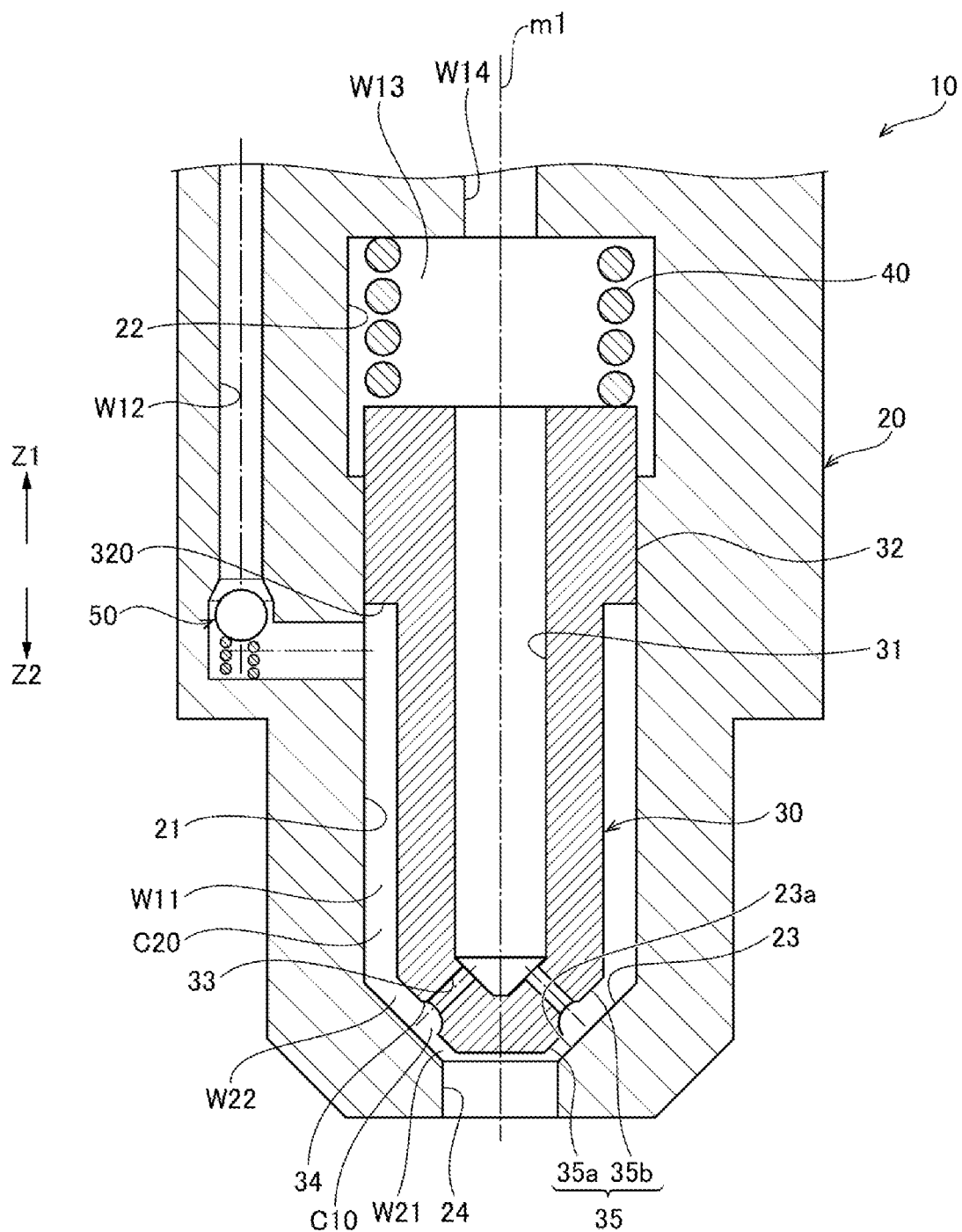
FIG. 2 is a schematic cross-sectional view showing a fluid injection device of the first embodiment.

As shown in FIG. 2, the fluid injection device 10 has a valve body 20 and a valve member 30. The valve body 20 is formed in a cylindrical shape having a center of an axis line ml. In the present disclosure, a direction of the axis line ml is referred to an axial direction. In addition, an upward direction Z1 which is in parallel to the axis line ml is referred to as an axial upward direction, while a downward direction Z2 which is also in parallel to the axis line ml is referred to as an axial downward direction.

A first valve-member accommodation hole 21 and a second valve-member accommodation hole 22, each of which extends in the axial direction of the axis line ml, are formed in the valve body 20. The valve member 30 is movably accommodated in the first and the second valve-member accommodation holes 21 and 22. The first and the second valve-member accommodation holes 21 and 22 are coaxially formed with each other around the axis line ml. A cross-sectional shape of each of the first and the second valve-member accommodation holes 21 and 22, which has the center at the axis line ml, has a circular shape. The first and the second valve-member accommodation holes 21 and 22 are arranged in this order in the axial upward direction Z1 from a lower-side end to an upper-side end of the valve body 20. The second valve-member accommodation hole 22 has an inner diameter larger than that of the first valve-member accommodation hole 21.

An annular fluid passage W11 is formed in a space formed between an inner peripheral surface of the first valve-member accommodation hole 21 and an outer peripheral surface of the valve member 30. The annular fluid passage W11 is formed in an annular shape having a center at the axis line ml. An air supply passage W12 is formed along a left-hand side wall of the valve body 20 in the axial direction and connected to the annular fluid passage W11. The air is supplied from the air pump 11 (shown in FIG. 1) to the air supply passage W12. As above, the air having a high pressure is supplied to the annular fluid passage W11 through the air supply passage W12. A check valve 50, which is also referred to as a flow restricting device, is provided in the air supply passage W12 for restricting a reverse flow of the air in the axial upward direction Z1 from the annular fluid passage W11 to the air supply passage W12 and the air pump 11.

An injection port 24 is formed at a center of the lower-side end of the valve body 20, wherein the injection port 24 penetrates the valve body 20 in the axial direction from an inside of the first valve-member accommodation hole 21 to an outside of the valve body 20. A part of the inner peripheral surface of the first valve-member accommodation hole 21, which is located at the lower-side end of the valve body 20, is formed with a conical surface 23. In other words, the inner peripheral surface at the lower-side end of the valve body 20 is formed in a conical shape having a center at the axis line ml. The conical surface 23 is formed in such a way that an inner diameter of the conical surface 23 at each point becomes smaller in the axial downward direction Z2 as each point of the conical surface 23 comes closer to the injection port 24.

An inside space of the second valve-member accommodation hole 22 forms a liquid supply passage W13. A liquid supply port W14 is formed in the valve body 20 and communicated to the liquid supply passage W13. As shown in FIG. 1, the liquid supply port W14 is connected to the liquid tank 12. The liquid (the urea aqueous solution) is supplied from the liquid tank 12 to the liquid supply passage W13 through the liquid supply port W14.

The valve member 30 is formed in a cylindrical shape having a center at the axis line ml. In the present disclosure, the axis line ml corresponds to a center line of the valve member 30. A flanged portion 32 is formed at an upper-side end of the valve member 30. An outer peripheral surface of the flanged portion 32 is in a sliding contact with the inner peripheral surface of the first valve-member accommodation hole 21. The valve member 30 is movably supported by and in the valve body 20 due to the sliding contact, so that the valve member 30 is movable relative to the valve body 20 in the axial direction of the axis line ml. The annular fluid passage W11 is fluid-tightly separated from the liquid supply passage W13 by this sliding contact between the first valve-member accommodation hole 21 and the flanged portion 32 of the valve member 30.

A lower-side end of the valve member 30 is formed in a conical shape having a center at the axis line ml. A conical surface 35 formed at the lower-side end of the valve member 30 is opposed to the conical surface 23 of the valve body 20 in the axial direction. An annular groove 34, which has a center at the axis line ml, is formed in the conical surface 35. The conical surface 35 of the valve member 30 is composed of a first conical surface portion 35a and a second conical surface portion 35b at both axial sides of the annular groove 34. The first conical surface portion 35a is also referred to as a valve surface portion 35a, while the second conical surface portion 35b is also referred to as a passage reducing portion 35b. A part of the conical surface 23 of the valve body 20, which is opposed to the valve surface portion 35a, is referred to a valve seat portion 23a.

Figure 3:
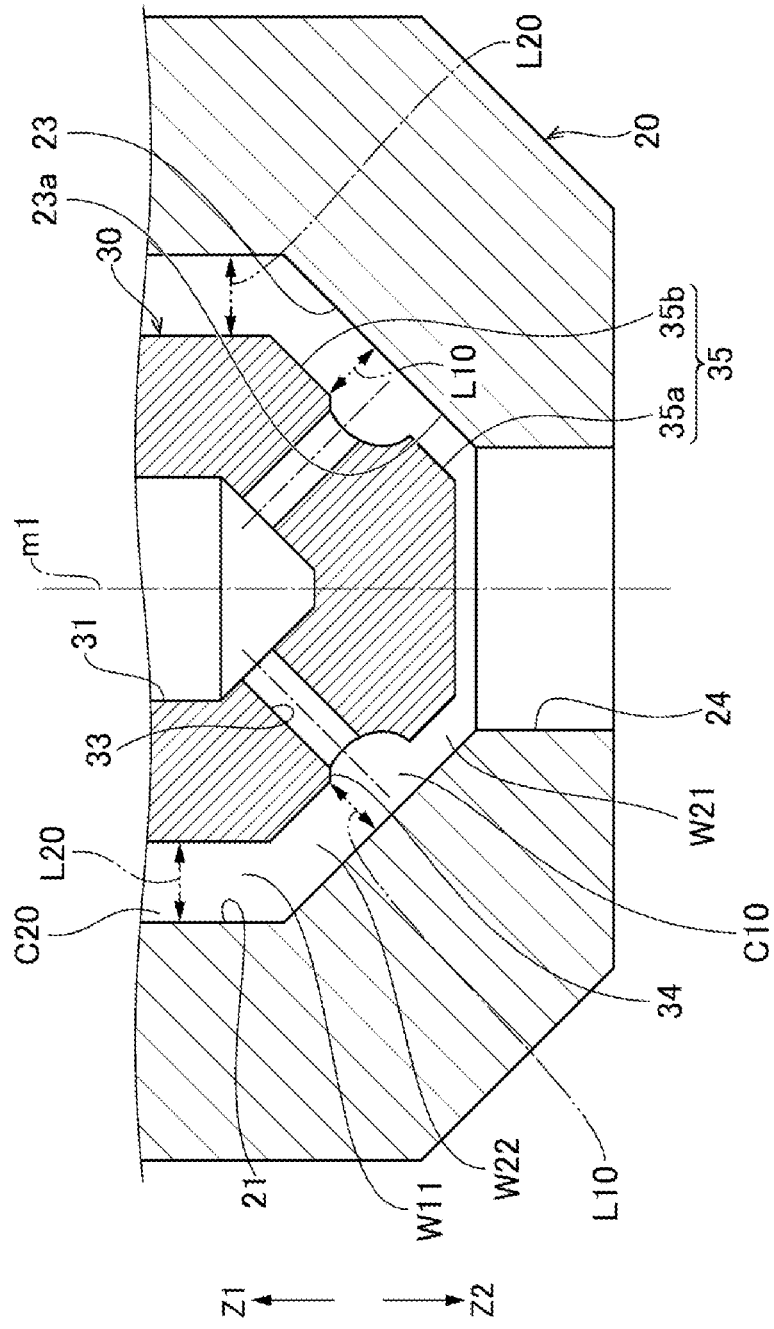
FIG. 3 is a schematically enlarged cross-sectional view showing a forward end portion of the fluid injection device of the first embodiment.

As shown in FIG. 3, a gap formed between the valve seat portion 23a of the valve body 20 and the valve surface portion 35a of the valve member 30 works as a first injection passage W21. A gap formed between the conical surface 23 of the valve body 20 and the passage reducing portion 35b of the valve member 30 works as a second injection passage W22. A passage width of the first injection passage W21 is smaller than a passage width of the second injection passage W22. Each of the first and the second injection passages W21 and W22 is a part of the annular fluid passage W11.

As shown in FIG. 2, an inside passage 31 is formed in the valve member 30 in such a manner that the inside passage 31 extends in an inside of the valve member 30 along the axis line ml. An upper-side end of the inside passage 31 is opened at an upper-side end surface of the valve member 30 to the liquid supply passage W13 of the valve body 20. Multiple communication ports 33 are formed in a forward end portion of the valve member 30 in such a manner that the multiple communication ports 33 extends in a radial fashion and each of the communication ports 33 extends from the inside passage 31 to the annular fluid passage W11. According to the above structure, the urea aqueous solution flows into the liquid supply passage W13 of the valve body 20 and the urea aqueous solution is supplied to the annular groove 34 through the inside passage 31 and the multiple communication ports 33. In the present embodiment, each of the communication ports 33 is opened at the annular groove 34. A portion C10 of the annular fluid passage W11, to which the annular groove 34 is connected, corresponds to a connecting passage portion C10 at which each of the communication ports 33 is connected to the annular fluid passage W11.

A spring 40 is accommodated in the second valve-member accommodation hole 22. The spring 40 biases the valve member 30 in a direction to the conical surface 23 of the valve body 20 (in the axial downward direction Z2), that is, in a valve closing direction. The valve closing direction is a direction, in which the valve surface portion 35a of the valve member 30 is coming closer to the valve seat portion 23a of the valve body 20. In the present embodiment, the spring 40 is also referred to as a biasing member.

An electrical structure of the fluid injection system 1 will be explained.

As shown in FIG. 1, the ECU 15 includes a pressure control portion 150, a pressure detecting portion 151, a flow rate detecting portion 152 and so on. The pressure detecting portion 151 detects the pressure of the air supplied from the air pump 11 to the fluid injection device 10, based on the output signal of the pressure sensor 13. The flow rate detecting portion 152 detects the flow rate of the air supplied from the air pump 11 to the fluid injection device 10, based on the output signal of the flow rate sensor 14. The pressure control portion 150 controls an opening and closing operation of the fluid injection device 10 based on the pressure and the flow rate of the air detected by the pressure detecting portion 151 and the flow rate detecting portion 152, in such a way that the pressure control portion 150 changes the pressure and the flow rate of the air to be supplied from the air pump 11 to the fluid injection device 10.

More exactly, the pressure control portion 150 carries out a normal liquid injection control at a predetermined cycle, so that the urea aqueous solution is injected from the fluid injection device 10. In the normal liquid injection control, the urea aqueous solution is injected from the fluid injection device 10 or the injection of the urea aqueous solution from the fluid injection device 10 is terminated depending on a valve position of the valve member 30, wherein the valve member 30 is moved to a valve opening position or a valve closing position by use of the pressure of the air supplied from the air pump 11 to the fluid injection device 10.

The pressure control portion 150 carries out a liquid discharging control and an air-supply terminating control (a gas-supply terminating control) in order to stop the liquid injection operation of the fluid injection device 10, after the urea aqueous solution is injected from the fluid injection device 10 by carrying out the normal liquid injection control. In the liquid discharging control, the valve member 30 is in the valve closing position. In addition, the urea aqueous solution remaining in the fluid injection device 10 is returned to the liquid tank 12 by use of the pressure of the air supplied from the air pump 11 to the fluid injection device 10. In the air-supply terminating control, the supply of the air from the air pump 11 to the fluid injection device 10 is stopped to completely terminate the operation (the injection of the liquid) of the fluid injection device 10.

The pressure control portion 150 carries out thereafter a liquid sucking control to start the operation (the injection of the liquid) of the fluid injection device 10, when it comes to a next injection timing. In the liquid sucking control, the injection of the urea aqueous solution is prepared by supplying the urea aqueous solution from the liquid tank 12 to the fluid injection device 10. The pressure control portion 150 starts the injection of the urea aqueous solution from the fluid injection device 10 through the normal liquid injection control, when the preparation for the injection is finished by the liquid sucking control.

The operation of the fluid injection device 10, which is carried out by the pressure control portion 150, will be further explained.

Figure 4:
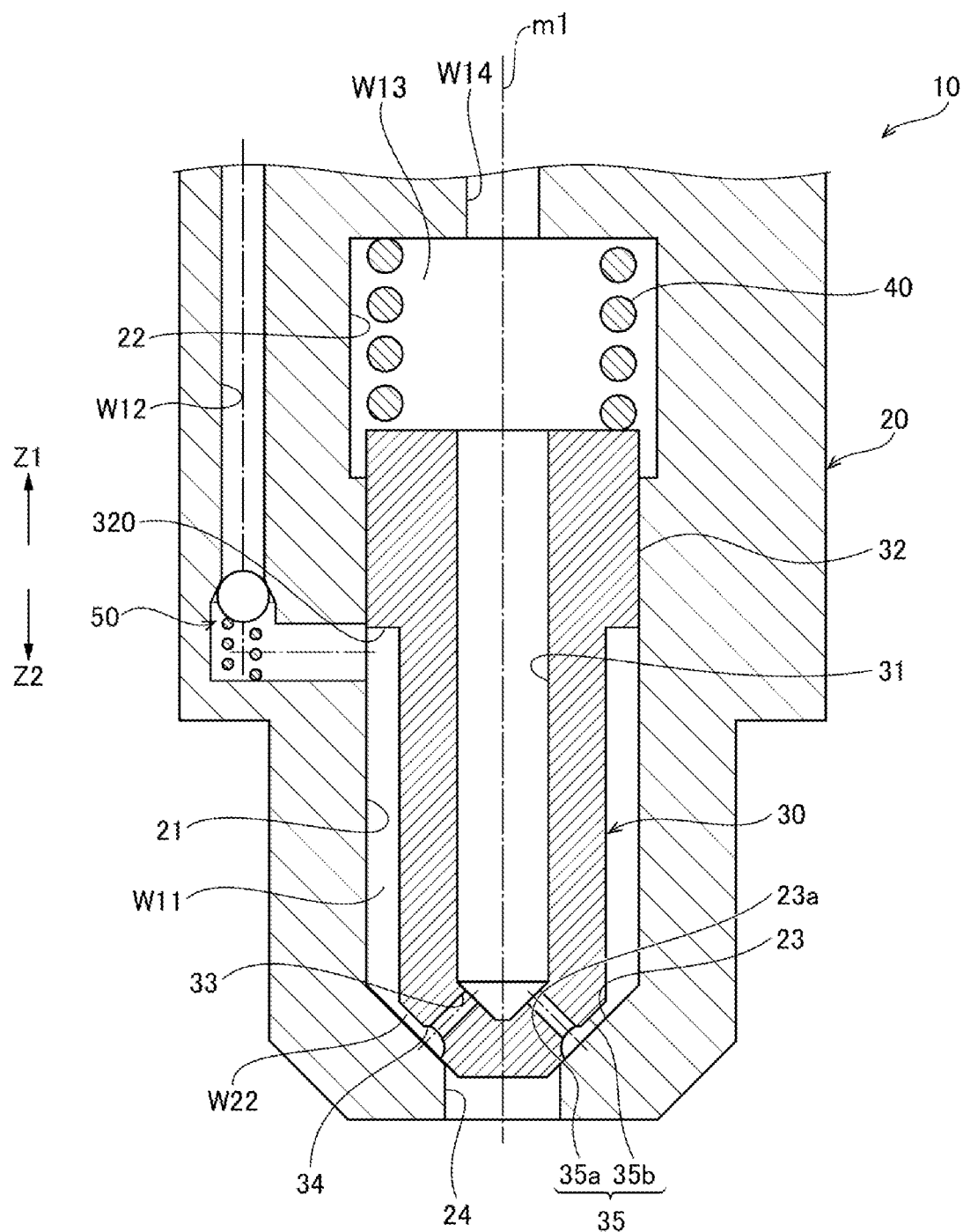
FIG. 4 is a schematic cross-sectional view showing an operation of the fluid injection device of the first embodiment.

The pressure control portion 150 controls the air pump 11 in such a way that the supply of the air to the fluid injection device 10 is terminated, in order that the valve member 30 is moved to the valve closing position in the normal liquid injection control. As shown in FIG. 4, the check valve 50 is closed when the supply of the air is stopped. In addition, the valve surface portion 35a of the valve member 30 is seated on the valve seat portion 23a of the valve body 20, because the valve member 30 is biased by the biasing force of the spring 40 in the axial downward direction Z2, that is, in the valve closing direction. When the valve member 30 is moved to the valve closing position, the first injection passage W21 is closed. Therefore, the injection of the urea aqueous solution and the air from the fluid injection device 10 is terminated.

In the normal liquid injection control, the pressure control portion 150 further controls the air pump 11 in such a manner that the air having an air pressure higher than a first preset value is supplied to the fluid injection device 10, in order that the valve member 30 is moved from the valve closing position of FIG. 4 to a valve opening position. The first preset value corresponds to such air pressure, which can move each of the check valve 50 and the valve member 30 to the respective valve opening positions. When the air having the pressure of the first preset value (or higher than that) is supplied to the air supply passage W12 of the fluid injection device 10, the check valve 50 is opened as shown in FIG. 2, so that the air of the high pressure (equal to or higher than the first preset value) is supplied to the annular fluid passage W11. When the pressure of the air supplied to the annular fluid passage W11 is applied to a lower-side surface 320 of the flanged portion 32 of the valve member 30 and to the passage reducing portion 35b, an air pressure force for pushing the valve member 30 in the axial upward direction Z1 (that is, in the valve opening direction) is applied to the valve member 30. In the present embodiment, the lower-side surface 320 of the flanged portion 32 of the valve member 30 and the passage reducing portion 35b correspond to a pressure receiving surface, to which the pressure of the air in the annular fluid passage W11 is applied. The valve opening direction is a direction in which the valve surface portion 35a of the valve member 30 is separated from the valve seat portion 23a of the valve body 20. When the valve member 30 is moved in the axial upward direction Z1 by the air pressure force in the valve opening direction against the biasing force of the spring 40, the injection port 24 is opened. A valve opened condition is maintained, in which the valve surface portion 35a of the valve member 30 is separated from the valve seat portion 23a of the valve body 20.

As shown in FIG. 3, a cross-sectional passage area of the annular fluid passage W11 at the connecting passage portion C10 is a cross-sectional area of a portion indicated by a two-dot-chain line L10, when the fluid injection device 10 is in the valve opened condition. Namely, the cross-sectional passage area of the annular fluid passage W11 at the connecting passage portion C10 is equal to a cross-sectional passage area of the second injection passage W22. A cross-sectional passage area of the annular fluid passage W11 at an upstream-side passage portion C20 of the second injection passage W22 is a cross-sectional area of a portion indicated by a two-dot-chain line L20. The cross-sectional passage area of the annular fluid passage W11 at the connecting passage portion C10 is smaller than the cross-sectional passage area of the annular fluid passage W11 at the upstream-side passage portion C20. A flow speed of the air in the connecting passage portion C10 of the annular fluid passage W11 is higher than that of the air in the upstream-side passage portion C20 of the annular fluid passage W11. When the air having a higher flow speed joins up with the urea aqueous solution in the annular groove 34, the urea aqueous solution is sucked from the annular groove 34 and joins up with the air. According to the above structure and operation, it is possible to atomize the urea aqueous solution based on the Bernoulli's theory. The urea aqueous solution, which is atomized by the air, is injected from the injection port 24 through the first injection passage W21.

In the fluid injection device 10, the urea aqueous solution is sucked out from the annular groove 34 by the air flowing through the connecting passage portion C10 of the annular fluid passage W11. Although any pump is not provided between the liquid tank 12 and the fluid injection device 10 for the urea aqueous solution in the present embodiment, it is possible to supply the urea aqueous solution from the liquid tank 12 (FIG. 1) to the fluid injection device 10 by a sucking force applied to the urea aqueous solution. According to the structure of the present embodiment, it is possible to supply the urea aqueous solution from the liquid tank 12 to the fluid injection device 10, even when the pressure of the urea aqueous solution is low or equal to zero.

Figure 5:
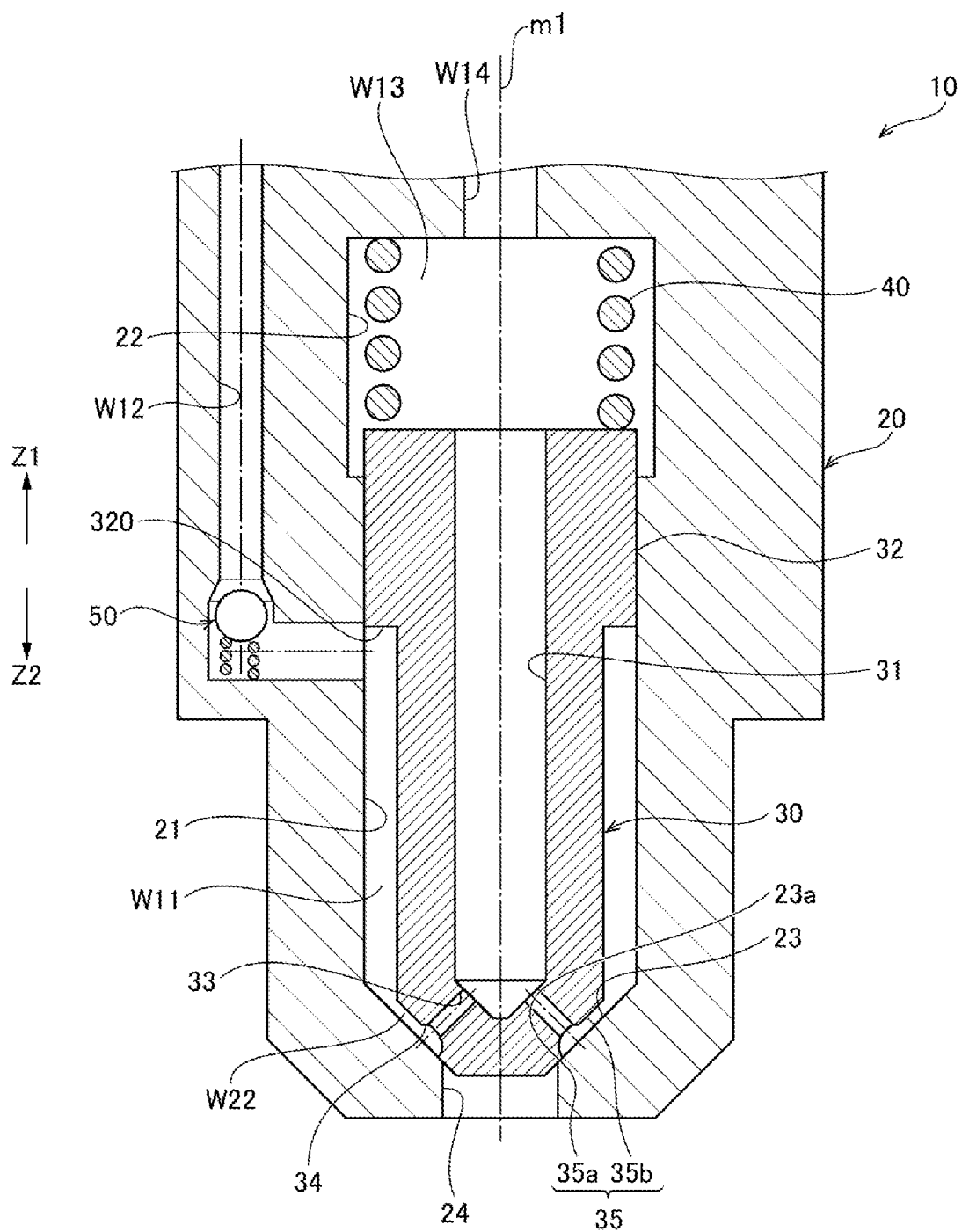
FIG. 5 is another schematic cross-sectional view showing the operation of the fluid injection device of the first embodiment.

The pressure control portion 150 carries out the air-supply (the gas-supply) terminating control after the liquid discharging control, when the operation (the normal liquid injection control) of the fluid injection device 10 is terminated. At first, in the liquid discharging control, the pressure control portion 150 controls the air pump 11 in such a manner that the air having a pressure of a second preset value is supplied to the fluid injection device 10. The second preset value is smaller than the first preset value. The second preset value corresponds to such a pressure, with which the check valve 50 can be opened but the valve member 30 cannot be opened. In other words, the second preset value corresponds to the pressure, with which the valve member 30 is maintained in a valve closed condition. As shown in FIG. 5, when the valve member 30 is maintained in the valve closing position while the check valve 50 is maintained in the valve opened condition, the air in the annular fluid passage W11 pushes the urea aqueous solution in the annular groove 34 of the valve member 30, so that the urea aqueous solution flows back from the annular groove 34 into the communication ports 33. Therefore, the urea aqueous solution, which remains in the communication ports 33, in the inside passage 31 of the valve member 30, in the liquid supply passage W13 and in the liquid supply port W14, flows back in the direction to the liquid tank 12. As a result, the urea aqueous solution is substantially discharged from the fluid injection device 10.

The pressure control portion 150 determines whether the urea aqueous solution has been discharged from the fluid injection device 10 to the liquid tank 12 or not based on the flow rate of the air, which is detected by the flow rate detecting portion 152. When the pressure control portion 150 determines that the urea aqueous solution has been substantially discharged from the fluid injection device 10 to the liquid tank 12, the pressure control portion 150 terminates the liquid discharging control. Namely, the pressure control portion 150 stops the operation of the air pump 11 as the air-supply terminating control.

More exactly, when the discharge of the urea aqueous solution from the fluid injection device 10 to the liquid tank 12 is completed, the air supplied from the air pump 11 to the fluid injection device 10 is also discharged to the liquid tank 12. When the air from the air pump 11 reaches the liquid tank 12, an air supply load (a gas supply load) for the air pump 11 is rapidly decreased. As a result, an air pump-out pressure at the air pump 11 is temporarily decreased. Since the air pump-out pressure of the air pump 11 is controlled at the second preset value during the liquid discharging control, the air pump 11 is so controlled to increase an air pump-out amount so that the air pump-out pressure is increased again to the second preset value. Accordingly, the flow rate of the air to be supplied from the air pump 11 to the fluid injection device 10 is rapidly increased. The pressure control portion 150 uses the above phenomenon and determines whether the air from the air pump 11 has reached the liquid tank 12 or not. Namely, the pressure control portion 150 determines that the air from the air pump 11 has reached the liquid tank 12, based on the phenomenon that the pressure of the air detected by the pressure detecting portion 151 is temporarily decreased or based on the phenomenon that the flow rate of the air detected by the flow rate detecting portion 152 is becomes larger than a predetermined value. The pressure control portion 150 controls the air pump 11 in such a way that the pressure of the air supplied to the fluid injection device 10 is maintained at the second preset value, in a period from a timing at which the liquid discharging control is started to a timing at which the pressure control portion 150 determines that the air from the air pump 11 has reached the liquid tank 12. The pressure control portion 150 terminates the liquid discharging control when it determines that the air from the air pump 11 has reached the liquid tank 12 and stops the operation of the air pump 11 as the air-supply terminating control. As above, it is possible to stop the air pump 11 after the urea aqueous solution has been surely discharged from the fluid injection device 10 to the liquid tank 12.

The pressure control portion 150 carries out the liquid sucking control, when starting the operation (the liquid injection) of the fluid injection device 10. The pressure control portion 150 controls the air pump 11 in the liquid sucking control in such a way that the air having the pressure of the first preset value is supplied to the fluid injection device 10. When the air of the first preset value is supplied to the fluid injection device 10, each of the check valve 50 and the valve member 30 is moved to its valve opening position, as shown in FIG. 2. Therefore, the air supplied from the air pump 11 to the fluid injection device 10 is injected from the injection port 24 via the air supply passage W12, the annular fluid passage W11, the second injection passage W22 and the first injection passage W21.

In this operation of the liquid sucking control, the air flowing through the second injection passage W22 and the first injection passage W21 is injected from the injection port 24, while the above air sucks the air from the annular groove 34. Negative pressure is thereby produced in the annular groove 34. The air existing in the liquid supply passage W13 of the valve body 20, the inside passage 31 of the valve member 30 and the communication ports 33 is gradually discharged to the outside of the fluid injection device 10. The urea aqueous solution is then sucked from the liquid tank 12 to the fluid injection device 10 due to the above air flow (the negative pressure in the liquid supply passage W13) and thereby the urea aqueous solution is supplied to the fluid injection device 10.

Thereafter, the pressure control portion 150 determines whether the urea aqueous solution has reached the annular groove 34 of the valve member 30 or not based on the flow rate of the air detected by the flow rate detecting portion 152. When it determines that the urea aqueous solution has reached the annular groove 34, the pressure control portion 150 terminates the liquid sucking control.

More exactly, when the urea aqueous solution reaches the annular groove 34, not only the air but also the urea aqueous solution flows through the first injection passage W21. Since the urea aqueous solution works as an obstacle for the flow of the air, the air supply load of the air pump 11 is rapidly increased. As a result, the air pump-out pressure of the air pump 11 is temporarily increased. Since the air pump-out pressure of the air pump 11 is controlled at the first preset value during the liquid sucking control, the air pump 11 is so controlled that the air pump-out pressure is decreased to the first preset value. Namely, the air pump 11 is controlled so that the air pump-out amount from the air pump 11 is decreased. Then, the flow rate of the air supplied from the air pump 11 to the fluid injection device 10 is rapidly decreased. The pressure control portion 150 determines that the urea aqueous solution has reached the annular groove 34 based on the detection by the pressure detecting portion 151 (the detection that the pressure of the air is temporarily increased) or the detection by the flow rate detecting portion 152 (the detection that the flow rate of the air becomes lower than the predetermined amount).

When the pressure control portion 150 determines that the urea aqueous solution has reached the annular groove 34, it controls the air pump 11 in such a way that the supply of the air to the fluid injection device 10 is terminated. The pressure control portion 150 then terminates the liquid sucking control. The valve member 30 is thereby moved to the valve closing position. The preparation for injecting the urea aqueous solution from the fluid injection device 10 is completed. Thereafter, the pressure control portion 150 carries out the normal liquid injection control to inject the urea aqueous solution from the fluid injection device 10.

The fluid injection system 1 as well as the fluid injection device 10 of the present embodiment has the following advantages (A1) to (A9).

(A1) In the present embodiment, the portion of the annular fluid passage W11, which is connected to the communication ports 33 of the valve member 30, is defined as the connecting passage portion C10. The cross-sectional passage area of the annular fluid passage W11 at the connecting passage portion C10 is made smaller than the cross-sectional passage area of the annular fluid passage W11 at the upstream-side passage portion C20. According to the above structure, the urea aqueous solution flowing through the communication ports 33 can be atomized by the air flowing through the annular fluid passage W11. Therefore, the fluid injection device 10 can inject the atomized urea aqueous solution. Since the fluid injection device 10 has the structure, according to which the cross-sectional passage area of the connecting passage portion C10 of the annular fluid passage W11 is made smaller than that of the upstream-side passage portion C20, it is possible to simplify the structure of the fluid injection device 10.

(A2) In the liquid discharging control, the urea aqueous solution remaining in the annular groove 34 and in the communication ports 33 is returned to the liquid tank 12 by the pressure of the air flowing into the annular fluid passage W11. In the above operation, it is difficult to completely return the urea aqueous solution which remains in a part of the annular fluid passage W11, from a valve contacting portion between the valve surface portion 35a and the valve seat portion 23a to the annular groove 34 and to the liquid tank 12.

In a case that the communication ports 33 are provided at such positions which are located on an upstream side of the valve surface portion 35a in the air flow direction and which are separated from the valve surface portion 35a, the valve contacting portion between the valve surface portion 35a and the valve seat portion 23a is separated from the annular groove 34. In such a case when the liquid discharging control is carried out, the urea aqueous solution remaining in the portion of the annular fluid passage W11 between the valve contacting portion and the annular groove 34 may not completely return to the liquid tank 12.

In the fluid injection device 10 of the present embodiment, however, the annular groove 34 is formed on the outer peripheral surface of the valve member 30 at such a position, which is neighboring to (not separated from but close to) the valve surface portion 35a. According to such a structure, it is possible to form the annular groove 34 at the position close to the valve contacting portion between the valve surface portion 35a and the valve seat portion 23a. It is, thereby possible to avoid a situation that the urea aqueous solution may remain in the annular fluid passage W11 when the liquid discharging control is carried out. In addition, when the valve member 30 is opened, the first injection passage W21 has a cross-sectional passage area, which is the smallest among the cross-sectional passage areas of the annular fluid passage W11. Since the flow speed of the air in the first injection passage W21 is increased, the urea aqueous solution can be properly atomized.

(A3) The multiple communication ports 33 are formed in the valve member 30. The annular groove 34 is formed at the outer peripheral surface of the valve member 30 in such a way that an opened portion of each communication port 33 is connected to one another via the annular groove 34. According to the above structure, since the urea aqueous solution from the opened portion of each communication port 33 stays in the annular groove 34, it is possible to supply the urea aqueous solution not only to a passage area of the annular fluid passage W11 around the opened portion of each communication port 33 but also to an entire passage area of the annular fluid passage W11. It is thereby possible to uniformly inject the urea aqueous solution from an entire circumference of the injection port 24. When the valve member 30 is in the valve closing position during the normal liquid injection control, it is preferable that a boundary surface between the air and the urea aqueous solution is located at a position between the annular groove 34 and the annular fluid passage W11.

(A4) When the valve member 30 is in the valve closing position, the pressure of the air is applied to the lower-side surface 320 of the flanged portion 32 and the passage reducing portion 35b of the valve member 30. The valve member 30 is moved by the above air pressure in the valve opening direction against the biasing force of the spring 40. The valve surface portion 35a of the valve member 30 is separated from the valve seat portion 23a of the valve body 20 and the valve member 30 is opened. According to the above structure, the valve member 30 can be moved to the valve closing position or the valve opening position by simply adjusting the pressure of the air to be supplied to the fluid injection device 10. In other words, it is not necessary to provide a driving device, such as, an electromagnetic valve or the like, for opening and closing the valve member 30. As a result, it is possible to simplify the structure of the fluid injection device 10.

(A5) In a case that the liquid tank 12 is located at a position higher in a vertical direction than the fluid injection device 10, a pressure difference is generated by a difference of liquid levels between the urea aqueous solution in the liquid tank 12 and the urea aqueous solution in the inside of the fluid injection device 10. The fluid pressure generated by the pressure difference is applied to the urea aqueous solution in the fluid injection device 10.

If the fluid injection device 10 has such a structure, according to which the air can flow back from the annular fluid passage W11 to the air supply passage W12, the air is pushed back from the annular fluid passage W11 to the air supply passage W12 by the fluid pressure applied to the urea aqueous solution in the fluid injection device 10. Then, the urea aqueous solution may flow into the fluid injection device 10 in spite that it is not a timing for injecting the urea aqueous solution.

According to the present embodiment, however, the check valve 50 is provided in the valve body 20 as the flow restricting device, which limits the air flow from the annular fluid passage W11 to the air supply passage W12. According to the above structure, it is possible to avoid a situation that the air flows back from the annular fluid passage W11 to the air supply passage W12, even in the case the fluid pressure generated by the difference of the liquid level is applied to the urea aqueous solution in the fluid injection device 10. As a result, it is possible to avoid the situation that the urea aqueous solution flows from the liquid tank 12 to the fluid injection device 10 in the period in which the urea aqueous solution should not be injected.

(A6) The pressure control portion 150 controls the air pump 11 in such a way that the air having the pressure of the second preset value is supplied to the fluid injection device 10 when the valve member 30 is in the valve closed condition. Then, the air is supplied from the annular fluid passage W11 to the communication ports 33 and the inside passage 31 of the valve member 30 to thereby carry out the liquid discharging control, according to which the urea aqueous solution existing in the communication ports 33 and the inside passage 31 is discharged to the liquid tank 12. The second preset value is the pressure, which is lower than the predetermined pressure (for example, the first preset value) for moving the valve member 30 in the valve opening direction.

According to the above structure, it is possible to discharge the urea aqueous solution from the fluid injection device 10 to the outside thereof when terminating the injection operation of the fluid injection device 10. It is thereby possible to avoid a situation that the urea aqueous solution may be frozen in the fluid injection device 10 and the fluid injection device 10 may be broken by such frozen of the urea aqueous solution, when the fluid injection device 10 is not in its operation.

In addition, even in a case that the urea aqueous solution cannot be completely discharged from the fluid injection device 10 by the liquid discharging control, it is possible to reduce the amount of the urea aqueous solution that may remain in the fluid injection valve 10. Therefore, even in a case that the urea aqueous solution of a small amount is frozen in the fluid injection device 10, it is possible to shorten a time required for unfreezing the frozen urea aqueous solution. It is thereby possible to improve a starting performance of the fluid injection device 10. Furthermore, it is possible to avoid a situation that the urea aqueous solution may be deteriorated in the fluid injection device 10 by heat, which is transmitted from the exhaust pipe of the engine to the fluid injection device 10.

(A7) The pressure control portion 150 determines, during the liquid discharging control, that the air has reached the liquid tank 12 when it detects the increase of the flow rate of the air based on the output signal from the flow rate detecting portion 152. Then, the pressure control portion 150 terminates the liquid discharging control.

According to the above operation, the liquid discharging control is continuously carried out until the urea aqueous solution is substantially discharged from the fluid injection device 10. It is, therefore, possible to surely discharge the urea aqueous solution from the fluid injection device 10. In addition, since the liquid discharging control is terminated when the urea aqueous solution has been discharged from the fluid injection device 10, it is possible to avoid a situation that the air is wastefully supplied to the fluid injection device 10.

(A8) The pressure control portion 150 carries out the liquid sucking control, according to which the pressure control portion 150 controls the air pump 11 at starting the injection operation of the fluid injection device 10 in such a way that the air having the pressure of the first preset value is supplied to the fluid injection device 10 when the urea aqueous solution is not yet filled in the inside passage 31 and the communication ports 33 of the valve member 30. Then, the negative pressure is generated in the annular groove 34 and the urea aqueous solution is sucked from the liquid tank 12 to the annular groove 34.

According to the above operation, it is possible to supply the urea aqueous solution from the liquid tank 12 to the fluid injection device 10 without using any kind of the liquid pump for supplying the urea aqueous solution from the liquid tank 12 to the fluid injection device 10. It is thereby possible to simplify the fluid injection system 1 to such an extent that the liquid pump is not necessary.

(A9) The pressure control portion 150 determines, during the liquid sucking control, that the urea aqueous solution has reached the annular groove 34, when the flow rate detecting portion 152 detects the decrease of the air. Then, the pressure control portion 150 terminates the liquid sucking control and determines that the preparation for the injection of the urea aqueous solution and the air is completed in the fluid injection device 10.

According to the above operation, it is possible to surely determine whether the preparation for the injection is completed in the fluid injection device 10 or not, in the case that the urea aqueous solution is not filled in the fluid injection device 10.

First Modification

A first modification of the fluid injection device 10 of the first embodiment will be explained.

In the ECU 15 of the first modification, a pump-out load detecting portion 153 is provided instead of (or in addition to) the flow rate detecting portion 152, as indicated by a dotted line in FIG. 1. The pump-out load detecting portion 153 detects a pump-out load (equal to the air supply load) of the air pump 11 for the air to be supplied from the air pump 11 to the fluid injection device 10, based on a driving current to the air pump 11. More exactly, the pump-out load detecting portion 153 detects the driving current to the air pump 11. Then, the pump-out load detecting portion 153 determines that the pump-out load for the air is high when the detected driving current is large, while it determines that the pump-out load for the air is low when the detected driving current is small.

A relationship between the driving current for the air pump 11 and the pump-out load of the air pump 11 for the air is obtained in advance based on experiments or the like and the relationship is stored in a memory device of the ECU 15. The pump-out load for the air is quantified. When such a quantified value is high, it indicates that the pump-out load for the air is high.

When the pump-out air from the air pump 11 reaches the liquid tank 12 during the operation of the liquid discharging control, the pump-out pressure of the air by the air pump 11 is temporarily decreased and the pump-out load is rapidly decreased. During the liquid discharging control, a pressure equalizing control is carried out, according to which the air pump 11 is controlled in such a way that the pump-out pressure of the air is controlled at the second preset value. It is therefore possible to increase the pump-out amount of the air when the pump-out pressure of the air temporarily decreased, since the pump-out pressure of the air is increased to the second preset value by the pressure equalizing control. As a result, the pump-out load of the air pump 11 is increased.

According to the first modification, the pressure control portion 150 determines, during the liquid discharging control, that the air has reached the liquid tank 12, when the pressure control portion 150 determines that the pump-out load of the air detected by the pump-out load detecting portion 153 is increased. Then, the pressure control portion 150 terminates the supply of the air to the fluid injection device 10.

The pump-out load for the air pump 11 is transiently decreased, immediately after the air pumped out from the air pump 11 has reached the liquid tank 12. Therefore, the pressure control portion 150 may alternatively detect the above transient decrease of the pump-out load, determine that the air has reached the liquid tank 12, and terminate the supply of the air to the fluid injection device 10.

As explained above, when the urea aqueous solution from the liquid tank 12 reaches the annular groove 34 during the operation of the liquid sucking control, the pump-out pressure of the air from the air pump 11 is temporarily increased and thereby the pump-out load for the air pump 11 is rapidly increased.

The pressure equalizing control is also carried out during the operation of the liquid sucking control, in such a way that the pump-out pressure of the air for the air pump 11 is controlled at the first preset value. Therefore, when the pump-out pressure is temporarily increased, the pump-out amount of the air is so controlled as to be decreased so that the pump-out pressure of the air is decreased to the first preset value. As a result, the pump-out load for the air pump 11 is decreased.

The pressure control portion 150 determines, during the operation of the liquid sucking control, that the urea aqueous solution has reached the annular groove 34, when the pressure control portion 150 determines that the pump-out load of the air detected by the pump-out load detecting portion 153 is decreased. The pressure control portion 150 terminates the liquid sucking control and determines that the preparation for the injection of the urea aqueous solution is completed in the fluid injection device 10.

The pump-out load for the air pump 11 is transiently increased, immediately after the urea aqueous solution from the liquid tank 12 has reached the annular groove 34. The pressure control portion 150 may alternatively detect the above transient increase of the pump-out load, determine that the urea aqueous solution has reached the annular groove 34, terminate the liquid sucking control, and determine that the preparation for the injection of the urea aqueous solution has been completed in the fluid injection device 10.

According to the fluid injection system 1 of the above first modification, the same advantages to those of the first embodiment can be obtained. In addition, since the flow rate sensor 14 is not always necessary, the structure of the fluid injection system 1 can be simplified.

Second Modification

The fluid injection system 1 according to a second modification of the first embodiment will be explained.

Figure 6:
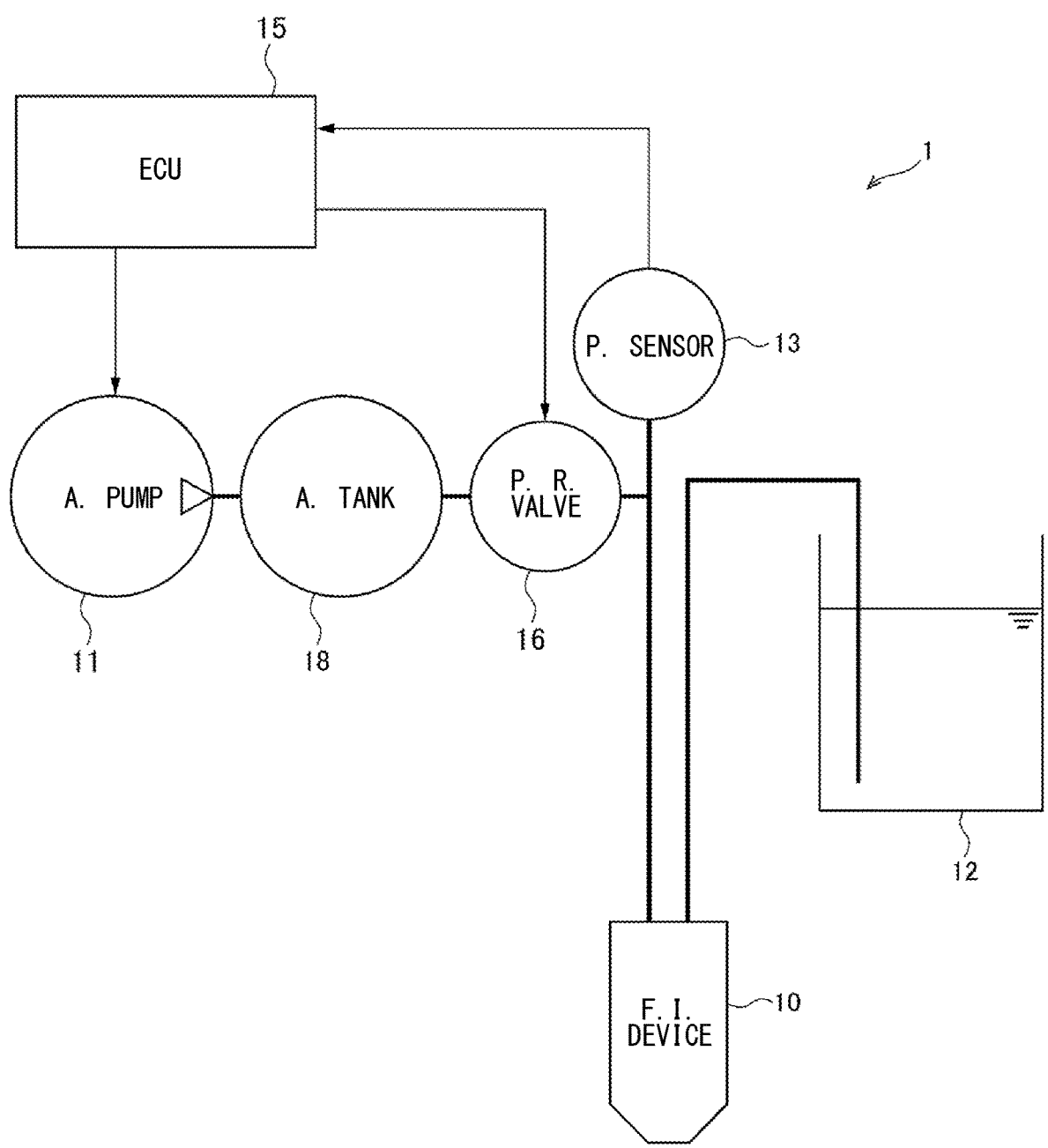
FIG. 6 is a block diagram showing an outline of a fluid injection system according to a modification of the first embodiment.

As shown in FIG. 6, in the fluid injection system 1 of the second modification, a pressure regulating valve 16 and an air tank 18 are provided between the fluid injection device 10 and the air pump 11. In this second modification, the air pump 11, the pressure regulating valve 16 and the air tank 18 constitute the gas supply unit. The air having a predetermined pressure and supplied from the air pump 11 is stored in the air tank 18. The pressure regulating valve 16 regulates the pressure of the air in the air tank 18 and supplies such a pressure-regulated air to the fluid injection device 10. The pressure regulating valve 16 is controlled by the pressure control portion 150 (shown in FIG. 1) of the ECU 15. The pressure regulating valve 16 corresponds to a pressure regulating portion.

According to the above structure, the air tank 18 absorbs pulsation of the air to be supplied from the air pump 11 to the fluid injection device 10. In other words, it is possible to stably supply the air to the fluid injection device 10. As a result, it is possible to more uniformly inject the urea aqueous solution from the fluid injection device 10.

Second Embodiment

The fluid injection system 1 and the fluid injection device 10 of a second embodiment will be explained by focusing on differences between the first embodiment and the second embodiment.

Figure 7:
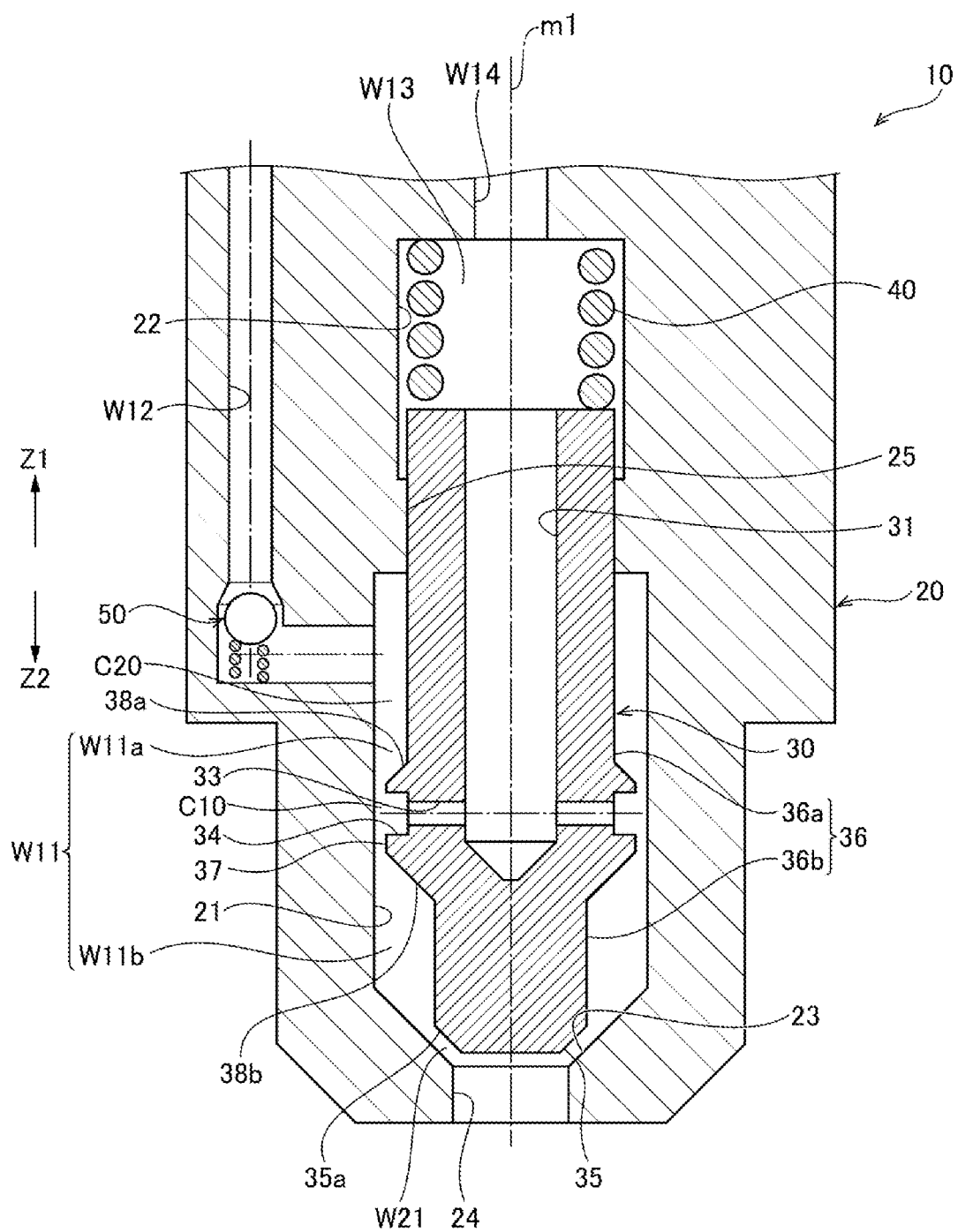
FIG. 7 is a schematic cross-sectional view showing a fluid injection device (a valve opened condition) according to a second embodiment.

As shown in FIG. 7, in the fluid injection device 10 of the present embodiment, an outwardly expanded portion 36 is formed at a middle portion of the valve member 30. The outwardly expanded portion 36 is expanded in a radial-outward direction of the valve member 30. The outwardly expanded portion 36 is also a cylindrical portion formed at an outer periphery of the valve member 30 and having a center axis, which coincides with the axis line ml of the valve member 30. The outwardly expanded portion 36 is formed at a position, which is separated from the forward end portion (the lower-side end) of the valve member 30 in the axial direction with a predetermined distance between the forward end portion and the outwardly expanded portion 36. A passage reducing portion 37 is formed at an outer periphery of the outwardly expanded portion 36, which is different from the structure of the first embodiment.

More exactly, the passage reducing portion 37 is projected in the radial-outward direction to the inner peripheral surface of the first valve-member accommodation hole 21 of the valve body 20. A radial-outer surface of the passage reducing portion 37 is formed by a cylindrical surface having a straight line extending in the axial direction of the valve member 30. In other words, the radial-outer surface is parallel to the inner peripheral surface of the valve body 20 in the axial direction. The annular groove 34 is formed at the radial-outer surface of the passage reducing portion 37. Each of the multiple communication ports 33 is opened at the annular groove 34, so that the inside passage 31 of the valve member 30 is communicated to the annular groove 34 through the multiple communication ports 33.

In the present disclosure, a portion of the valve member 30, which is located at a position above the passage reducing portion 37, is referred to as an upstream-side cylindrical portion 36a. A portion of the valve member 30, which is located at a position below the passage reducing portion 37, is referred to as a downstream-side cylindrical portion 36b. A portion of the annular fluid passage W11, which is formed between an outer peripheral surface of the upstream-side cylindrical portion 36a and the inner peripheral surface of the first valve-member accommodation hole 21 of the valve body 20, is referred to as an upstream-side fluid passage portion W11a (equal to the upstream-side passage portion C20). A portion of the annular fluid passage W11, which is formed between an outer peripheral surface of the downstream-side cylindrical portion 36b and the inner peripheral surface of the first valve-member accommodation hole 21 of the valve body 20, is referred to as a downstream-side fluid passage portion W11b.

An outer diameter of the upstream-side cylindrical portion 36a is larger than that of the downstream-side cylindrical portion 36b. A cross-sectional passage area of the upstream-side fluid passage portion W11a is smaller than that of the downstream-side fluid passage portion W11b. An inwardly projecting portion 25 of an annular shape is formed at an inner peripheral surface of the second valve-member accommodation hole 22. The outer peripheral surface of the upstream-side cylindrical portion 36a of the valve member 30 is in a sliding contact with an inner peripheral surface of the inwardly projecting portion 25. The valve member 30 is movably supported by and in the valve body 20 by the sliding contact, so that the valve member 30 is movable relative to the valve body 20 in the direction along the axis line ml, while a fluid tightness is ensured between the annular fluid passage W11 and the liquid supply passage W13. An upstream-side tapered surface 38a is formed at the outer peripheral surface of the valve member 30 (the outwardly expanded portion 36) between the passage reducing portion 37 and the upstream-side cylindrical portion 36a. In a similar manner, a downstream-side tapered surface 38b is formed at the outer peripheral surface of the valve member 30 between the passage reducing portion 37 and the downstream-side cylindrical portion 36b. A surface area of the downstream-side tapered surface 38b is larger than that of the upstream-side tapered surface 38a.

An operation of the fluid injection device 10 of the present embodiment will be explained.

Figure 8:
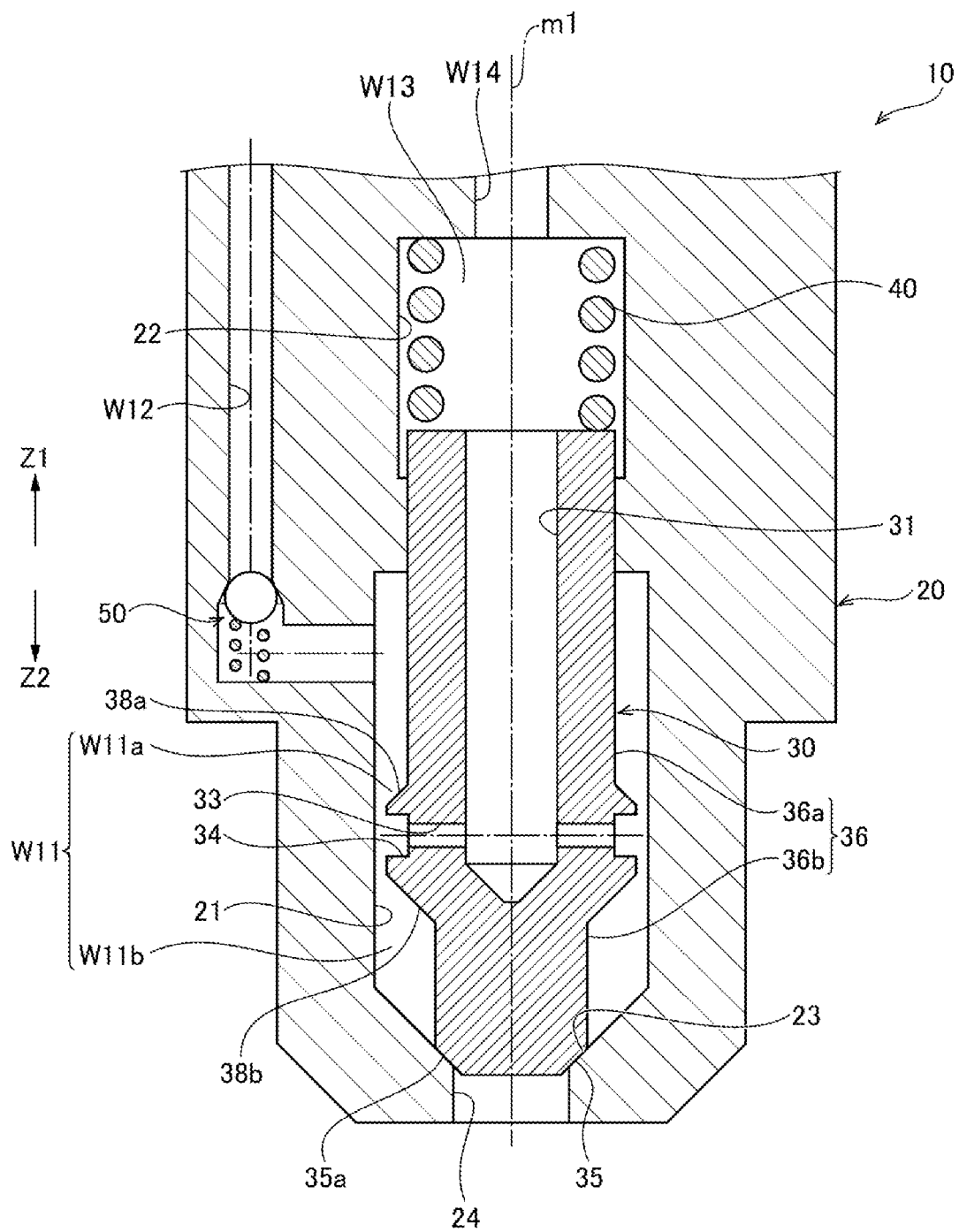
FIG. 8 is a schematic cross-sectional view showing an operation (a valve closed condition) of the fluid injection device of the second embodiment.

In a similar manner to the first embodiment, when the pressure control portion 150 (FIG. 1) starts the normal liquid injection control, the valve member 30 is biased by the biasing force of the spring 40 in the axial downward direction Z2 and thereby moved to the valve closing position, as shown in FIG. 8.

When the pressure control portion 150 controls the air pump 11 in such a way that the air having the pressure of the first preset value is supplied to the fluid injection device 10 to move the valve member 30 from the valve closing position of FIG. 8 to the valve opening position of FIG. 7, not only the pressure of the air in the upstream-side fluid passage portion W11a is applied to the upstream-side tapered surface 38a of the valve member 30 but also the pressure of the air in the downstream-side fluid passage portion W11b is applied to the downstream-side tapered surface 38b of the valve member 30. Since the surface area of the downstream-side tapered surface 38b is larger than that of the upstream-side tapered surface 38a, the force of the air applied to the downstream-side tapered surface 38b is larger than that applied to the upstream-side tapered surface 38a.

A difference of the force between the force applied to the downstream-side tapered surface 38b and the upstream-side tapered surface 38a is applied to the valve member 30 in the valve opening direction. When the valve member 30 is moved in the axial upward direction Z1 by the force of the valve opening direction against the biasing force of the spring 40, the valve member 30 opens the injection port 24, as shown in FIG. 7. The valve opened condition, in which the valve surface portion 35a of the valve member 30 is separated from the valve seat portion 23a of the valve body 20, is maintained.

When the valve member 30 is in the valve opening position, as shown in FIG. 7, the cross-sectional passage area at the connecting passage portion C10, at which the annular groove 34 is connected to the annular fluid passage W11, is smaller than the cross-sectional passage area at the upstream-side passage portion C20 of the annular fluid passage W11 (that is, the cross-sectional passage area of the upstream-side fluid passage portion W11a). In a similar manner to the fluid injection device 10 of the first embodiment, since the flow speed of the air flowing through the connecting passage portion C10 of the annular fluid passage W11 can be increased at the passage reducing portion 37, the urea aqueous solution can be sucked from the annular groove 34 and the sucked solution can be atomized when it is injected.

The pressure control portion 150 of the present embodiment further carries out the liquid discharging control, the air-supply terminating control and the liquid sucking control, in the same or similar manner to the pressure control portion 150 of the first embodiment. Since the operation of the fluid injection device 10 for those controls is basically the same to that of the fluid injection device 10 of the first embodiment, the detailed explanation thereof is omitted.

As above, the fluid injection system 1 as well as the fluid injection device 10 of the second embodiment has the same or similar operations and advantages to those of the first embodiment. In addition, the second embodiment has the following additional advantage A10.

(A10) Each of the communication ports 33 is opened at the outer peripheral surface of the outwardly expanded portion 36 of the valve member 30. When compared the above structure with the fluid injection device 10 of the first embodiment, it is possible in the present embodiment to make a length of the inside passage 31 shorter, which is formed in the valve member 30. In other words, it becomes easier to manufacture the valve member 30.

Third Embodiment

The fluid injection system 1 as well as the fluid injection device 10 of a third embodiment will be explained by focusing on differences between the first embodiment and the third embodiment.

Figure 9:
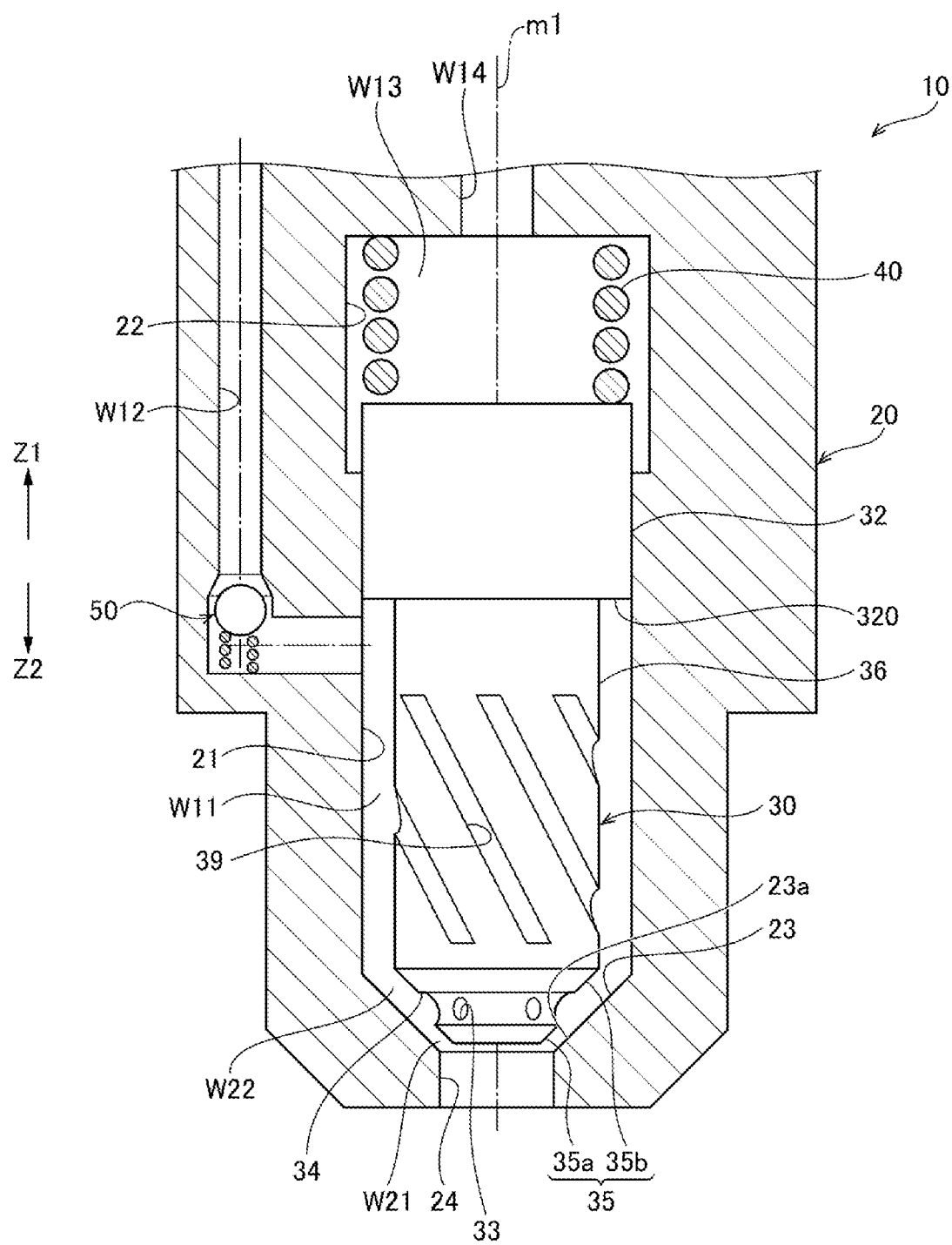
FIG. 9 is a schematic cross-sectional view showing a fluid injection device according to a third embodiment.

As shown in FIG. 9, multiple spiral grooves 39 are formed at the outer peripheral surface of the outwardly expanded portion 36 of the valve member 30, wherein each of the spiral grooves 39 extends in a spiral direction having a center at the axis line ml.

The fluid injection system 1 as well as the fluid injection device 10 of the present embodiment has the same or similar operations and advantages to those of the first embodiment. In addition, the third embodiment has the following additional advantage A11.

(A11) Since the air in the annular fluid passage W11 flows along the spiral grooves 39, a swirl flow is generated. When the urea aqueous solution is sucked from the annular groove 34 by the air of the swirl flow, the urea aqueous solution is further atomized. It becomes much easier to form the atomized urea aqueous solution when it is injected from the injection port 24.

Fourth Embodiment

The fluid injection system 1 as well as the fluid injection device 10 of a fourth embodiment will be explained by focusing on differences between the first embodiment and the fourth embodiment.

Figure 10:
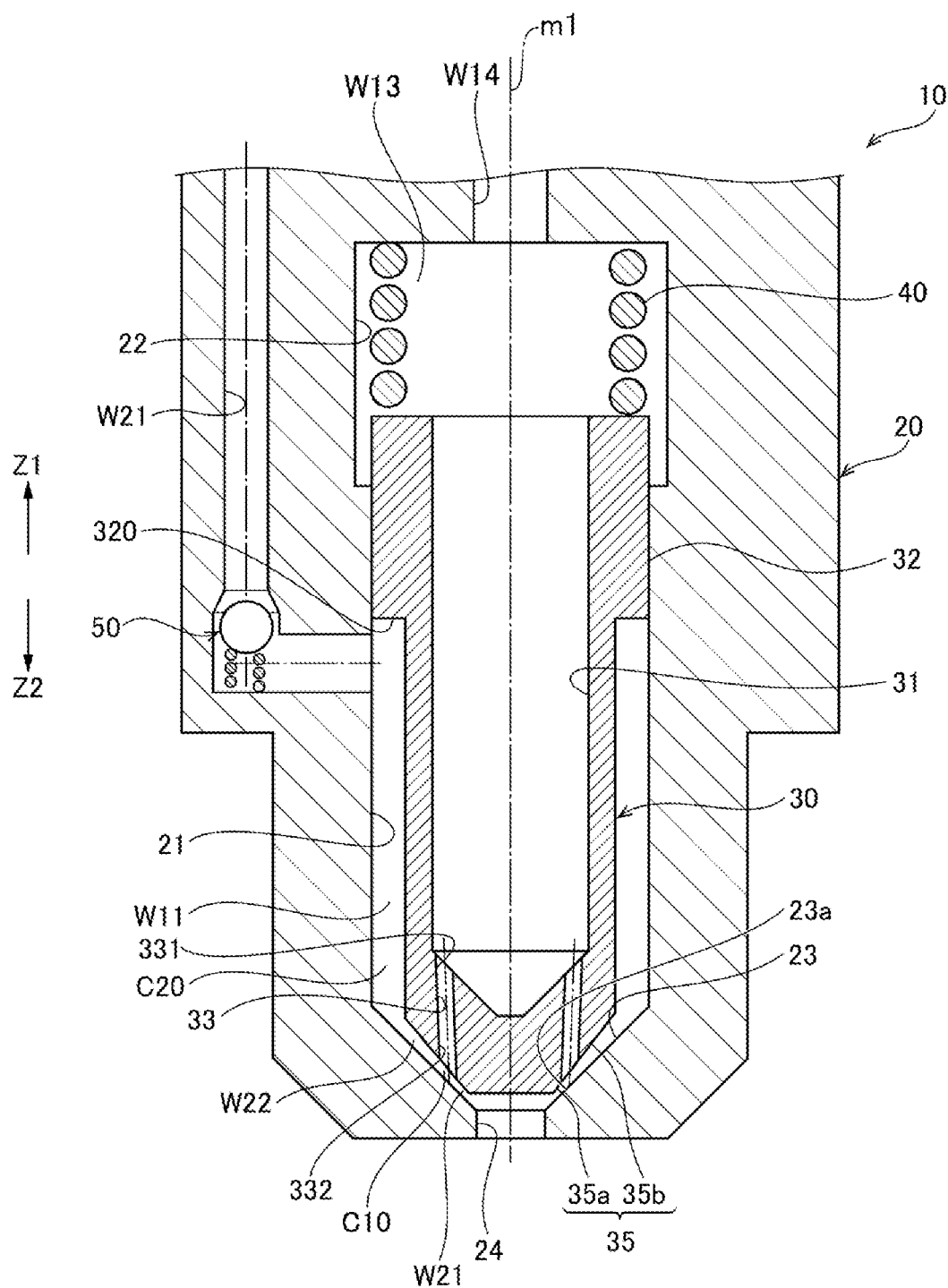
FIG. 10 is a schematic cross-sectional view showing a fluid injection device according to a fourth embodiment.

As shown in FIG. 10, in the fluid injection device 10 of the present embodiment, a structure corresponding to the annular groove 34 of the first embodiment is not provided. Each of the communication ports 33 has a first opening portion 331 opened to the inside passage 31 of the valve member 30 and a second opening portion 332 opened at the outer peripheral surface of the valve member 30. Each of the communication ports 33 is inclined with respect to the axis line ml of the valve member 30 in such a manner that each portion of the communication port 33 comes closer to the axis line ml as such each portion moves in the axial downward direction Z2 from the first opening portion 331 to the second opening portion 332.

The conical surface 35 of the valve member 30 is formed in such a way that a surface portion thereof comes closer to the conical surface 23 of the valve body 20 as the surface portion of the valve member 30 is located at a position closer to the forward end of the valve member 30 in the axial downward direction Z2. As a result, each of the passage areas of the first injection passage W21 and the second injection passage W22, each of which is formed between the conical surface 35 of the valve member 30 and the conical surface 23 of the valve body 20, becomes smaller in the direction to the injection port 24.

The above explained fluid injection system 1 as well as the fluid injection device 10 of the present embodiment has the same or similar operations and advantages to those of the first embodiment. In addition, the fourth embodiment has the following additional advantage A12.

(A12) Each of the communication ports 33 is formed in such a way that it comes closer to the axis line ml of the valve member 30 in the direction from the first opening portion 331 to the second opening portion 332. The urea aqueous solution flowing through the communication ports 33 joins the flow of the air flowing through the second injection passage W22 in a direction along the air flow. It is therefore possible to increase a sucking performance for sucking the urea aqueous solution from the communication ports 33. However, the similar function and performance can be obtained, even when the communication port 33 is arranged to be parallel to the axis line ml.

Fifth Embodiment

The fluid injection system 1 as well as the fluid injection device 10 of a fifth embodiment will be explained hereinafter by focusing on differences between the first embodiment and the fifth embodiment.

Figure 11:
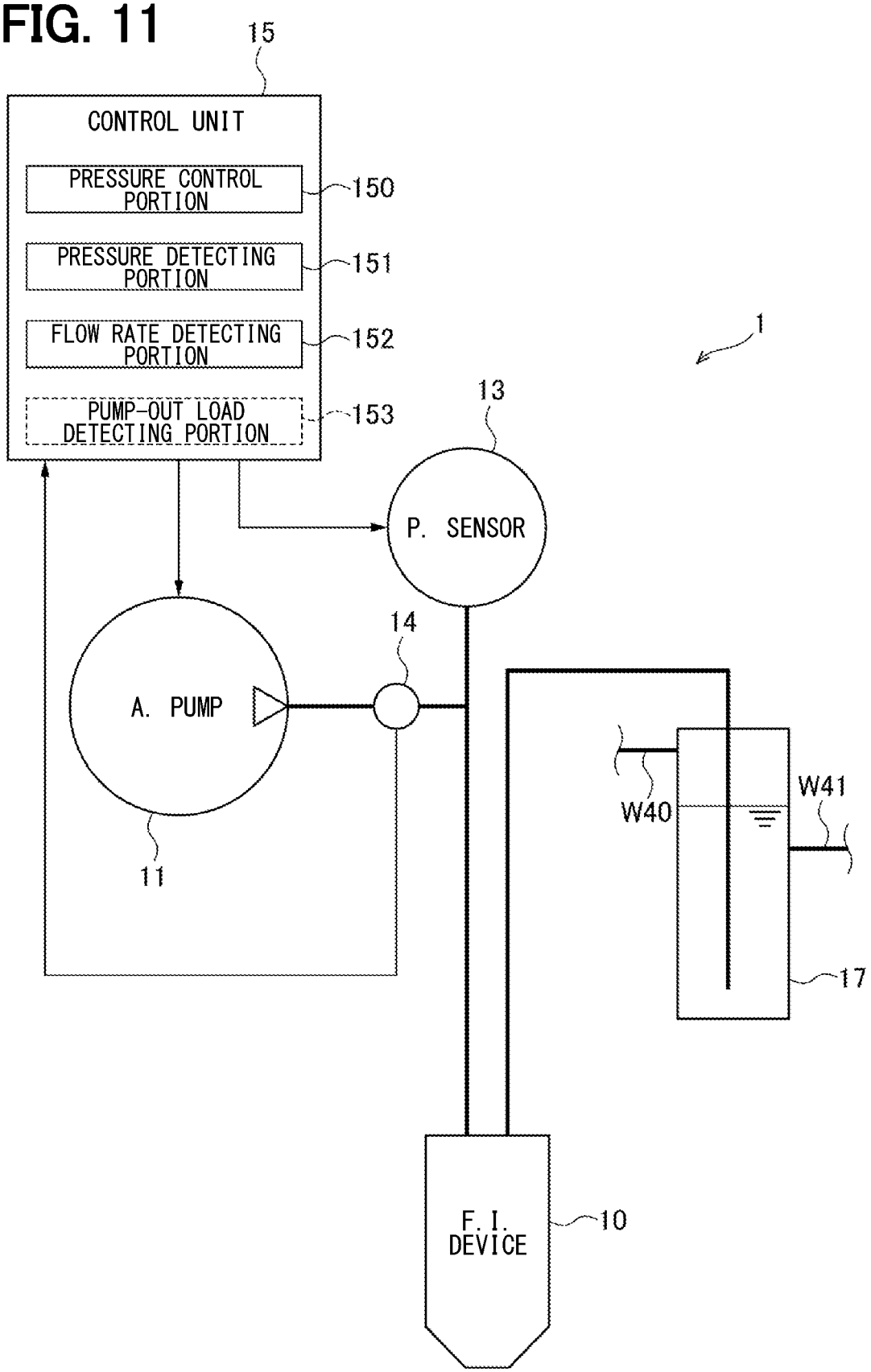
FIG. 11 is a block diagram showing an outline of a fluid injection system according to a fifth embodiment of the present disclosure.

The fluid injection system 1 of the present embodiment is different from that of the first embodiment in that the fluid injection device 10 of the present embodiment injects fuel into the exhaust passage of the engine, instead of the urea aqueous solution. As shown in FIG. 11, the fluid injection device 10 injects the fuel into the exhaust passage to avoid a situation that a purifying performance of an exhaust gas purifying catalyst provided in the exhaust pipe is decreased.

More exactly, a NOx storage and reduction catalyst is known in the art as one of exhaust gas purifying catalysts for purifying nitrogen oxide (NOx) contained in the exhaust gas. The NOx storage and reduction catalyst has a limit for its capacity for absorbing NOx. When a storage amount of NOx approaches its saturated level, the performance for absorbing NOx is decreased. In the fluid injection system 1 of the present embodiment, the fuel is injected from the fluid injection device 10 in order that an air-fuel mixture neighboring to the NOx storage and reduction catalyst provided in the exhaust pipe of the vehicle is temporarily made richer. The storage and reduction catalyst reduces the NOx absorbed in the catalyst and thereby prevents a decrease of the capacity for storing the NOx. As above, the fluid injection device 10 is used as a fuel adding valve for adding the fuel to the exhaust gas in the exhaust pipe.

As shown in FIG. 11, the fluid injection system 1 of the present embodiment has a sub fuel tank 17 for storing the fuel for the vehicle. The fuel (leak fuel) flows from a common rail (not shown) of the vehicle into the sub fuel tank 17 via a fuel pipe W40 and such fuel is temporarily stored therein. The fuel returns to a main fuel tank (not shown) of the vehicle via a fuel pipe W41. In the present embodiment, the sub fuel tank 17 corresponds to the liquid tank. The fluid injection device 10 of the present embodiment has the same structure to that of the above embodiments.

The fuel is supplied from the sub fuel tank 17 to the fluid injection device 10. The fuel from the sub fuel tank 17 is atomized in the fluid injection device 10 by the air supplied from the air pump 11 and such atomized fuel is injected from the fluid injection device 10. The injected fuel from the fluid injection device 10 is supplied to the NOx storage and reduction catalyst provided in the exhaust pipe of the vehicle.

The pressure control portion 150 controls the operation of the fluid injection device 10 so that it injects the fuel at a predetermined frequency. The pressure control portion 150 carries out the normal liquid injection control. After a predetermined amount of the fuel is injected from the fluid injection device 10, the pressure control portion 150 carries out the liquid discharging control in order that the fuel remaining in the inside of the fluid injection device 10 returns to the sub fuel tank 17. Thereafter, when a next injection timing comes, the pressure control portion 150 carries out the liquid sucking control. Then, the pressure control portion 150 carries out the normal liquid injection control after the liquid sucking control, so that the fuel is injected from the fluid injection device 10 into the exhaust pipe.

Since the operation of the fluid injection system 1 as well as the fluid injection device 10 of the present embodiment is the same to that of the first embodiment, the detailed explanation thereof is omitted.

The fluid injection system 1 as well as the fluid injection device 10 of the present embodiment has the following additional advantages A13 and A14.

(A13) In a case that the fuel remains in the inside of the fluid injection device 10, the fuel in the fluid injection device 10 may be deteriorated by the heat, which is transmitted from the exhaust gas flowing through the exhaust pipe to the fluid injection device 10. In the present embodiment, however, the pressure control portion 150 carries out the liquid discharging control and thereby the fuel remaining in the fluid injection device 10 is returned to the sub fuel tank 17. Therefore, the fuel in the fluid injection device 10 may not be deteriorated. It is thereby possible to avoid a situation that the fuel may be deposited. In addition, it is possible to avoid a situation that the fuel may leak from the fluid injection device 10 to the exhaust pipe.

(A14) In the fluid injection system 1, the sub fuel tank 17 is used as the fuel tank for supplying the fuel to the fluid injection device 10, wherein the sub fuel tank 17 stores the leak fuel from the common rail. According to the above structure, it is possible to locate the predetermined amount of fuel at a position neighboring to the fluid injection device 10. On the other hand, in a case in which the sub fuel tank is not provided and the fuel is directly supplied from the main fuel tank of the vehicle to the fluid injection device 10, a distance between the fluid injection device 10 and the main fuel tank may become longer.

When the distance between the fluid injection device 10 and the main fuel tank becomes longer, a flexibility for a layout of the related parts and components may be decreased, a time required for discharging the fuel from the fluid injection device to the main fuel tank may become longer, a time required for supplying the fuel from the main fuel tank to the fluid injection device 10 may become longer, and so on.

When the sub fuel tank is located at the position closer to the fluid injection device 10, not only the flexibility for the layout of the related parts and components can be increased, but also the fuel discharging time and/or the fuel supplying time for the fluid injection device 10 can be made shorter.

Further Embodiments and/or Modifications

The above embodiments and modifications can be further modified in the following manners:

(M1) In the fluid injection device 10 of the first to the fourth embodiments, the check valve 50 may be provided at the outside of the fluid injection device 10. In a case that the air pump 11 has a structure for restricting a reverse flow, it is not necessary to provide the check valve 50. In this case, the air pump 11 works as the flow restricting device for restricting the reverse flow of the air.

(M2) The structure of the gas supply unit for supplying the air to the fluid injection device 10 is not limited to the air pump 11. It may be so modified that a high-pressure air tank, which can store high-pressure air, is connected to the fluid injection device 10 via an air pipe and an ON-OFF valve is provided in the air pipe. In such a modified structure, when a pressure decreasing device may be provided in the air pipe, it becomes possible to regulate the pressure of the air to be supplied to the fluid injection device 10 by controlling an on-off operation of the pressure decreasing device. According to such a modification, it becomes unnecessary to provide the air pump 11 and the structure for the gas supply unit can be simplified.

(M3) A liquid pump may be further provided in the fluid injection system, according to which the urea aqueous solution of the liquid tank 12 or the fuel of the sub fuel tank 17 is pumped out by the liquid pump and supplied to the fluid injection device 10. In such a modification, when the liquid pump has a function for enabling the reverse flow, the liquid (the urea aqueous solution or the fuel) can be returned to the liquid tank 12 (or the sub fuel tank 17) by the liquid pump. According to the above structure, since the liquid sucking control and the liquid discharging control can be carried out by the liquid pump, it becomes unnecessary to regulate the pump-out pressure of the air from the air pump 11.

On the other hand, in a case that the liquid pump does not have the function for the reverse flow, the liquid (the urea aqueous solution or the fuel) can be returned by the operation of the air pump 11 from the fluid injection device 10 to the liquid tank 12 (or the sub fuel tank 17). According to the above structure and operation, it becomes possible that the liquid pump carries out the control for supplying the liquid (the urea aqueous solution or the fuel) from the liquid tank 12 (or the sub fuel tank 17) to the fluid injection device 10.

(M4) The operation and control of the control unit 15 may be carried out by one or multiple dedicated computers having a processor and a memory device, wherein the processor is so programmed that one or more than one functions are carried out. Alternatively, the operation and the control of the control unit 15 may be carried out by a dedicated computer having a processor, which includes one or multiple hardware logic circuits. Furthermore, the operation and the control of the control unit 15 may be carried out by one or multiple dedicated computers, which are structured by a combination a processor and a memory device that are programmed to carry out one or more than one functions and a processor which includes one or more than one hardware logic circuits. The computer program may be memorized, as an instruction to be carried out by the computer, in a machine-readable and non-transition memory device. The dedicated hardware logic circuit or the hardware logic circuit may be structured by digital circuits and/or analog circuits including logic circuits.

The present disclosure is not limited to the above embodiments and/or modifications but can be further modified in various manners without departing from a spirit of the present disclosure.

What is claimed is:

1. A fluid injection device comprising:
a valve body of a cylindrical shape;
a valve member movably accommodated in the valve body and having a valve surface portion, which is operatively seated on or separated from a valve seat portion formed in an inside of the valve body; and
an annular fluid passage formed between an inner peripheral surface of the valve body and an outer peripheral surface of the valve member, through which gas flows,
wherein the valve member includes;
an inside passage formed in an inside of the valve member and extending in an axial direction of the valve member, through which liquid flows; and
a communication port for communicating the inside passage to the annular fluid passage, the communication port being opened at the outer peripheral surface of the valve member at a position which is located on an upstream side of the valve surface portion in a flow direction of the gas flowing through the annular fluid passage along the axial direction of the valve member,
wherein the liquid is supplied from the inside passage to the annular fluid passage through the communication port, and the liquid supplied to the annular fluid passage from the communication port is injected together with the gas flowing through the annular fluid passage, when the valve member is in a valve opening position, wherein injection of the liquid and the gas is terminated, when the valve surface portion is seated on the valve seat portion to close the annular fluid passage,
wherein a cross-sectional passage area of a connecting passage portion is smaller than a cross-sectional passage area of an upstream-side passage portion,
wherein the connecting passage portion is a portion of the annular fluid passage, at which the communication port is connected to the annular fluid passage, and
wherein the upstream-side passage portion is another portion of the annular fluid passage, which is located at an upstream side of the connecting passage portion.

2. The fluid injection device according to claim 1, wherein the communication port is opened at the outer peripheral surface of the valve member at a position neighboring to the valve surface portion.

3. The fluid injection device according to claim 1, wherein the valve member has an outwardly expanded portion formed in a cylindrical shape having a center at an axis line of the valve member,
the inside passage is formed in an inside of the outwardly expanded portion, and
the communication port extends from the inside passage to an outer peripheral surface of the outwardly expanded portion.

4. The fluid injection device according to claim 1, wherein the communication port extends from the inside passage to the outer peripheral surface of the valve member in such a way that;
the communication port is in parallel to an axis line of the valve member, or
the communication port is inclined with respect to the axis line and comes closer to the axis line in the axial direction from the inside passage to the outer peripheral surface.

5. The fluid injection device according to claim 1, wherein a spiral groove is formed at the outer peripheral surface of the valve member in such a way that;
the spiral groove extends from an upstream side to a downstream side in an axis line of the valve member, and
the spiral groove has a spiral center at the axis line of the valve member.

6. The fluid injection device according to claim 1, wherein multiple communication ports are formed in the valve member,
an annular groove is formed at the outer peripheral surface of the valve member, and
each end of the communication port, which is opened at the outer peripheral surface of the valve member, is connected to each other via the annular groove.

7. The fluid injection device according to claim 1, wherein a biasing member is provided in the valve body for biasing the valve member in the axial direction to its valve closing position,
a pressure receiving surface is formed in the valve member for receiving pressure of the gas in the annular fluid passage, so that the valve member is pushed in the axial direction to its valve opening position, and
the valve member is moved to the valve closing position by a biasing force of the biasing member, or the valve member is moved against the biasing force to the valve opening position by a pushing force of the gas applied to the pressure receiving surface.

8. The fluid injection device according to claim 1, wherein a flow restricting unit is provided in the valve body for restricting a flow of the gas in a reverse direction from a downstream side to an upstream side.

9. A fluid injection system comprising;
the fluid injection device according to claim 1;
a gas supply unit for supplying the gas to the fluid injection device; and
a pressure control portion for controlling an operation of the gas supply unit to regulate the pressure of the gas to be supplied to the fluid injection device.

10. The fluid injection system according to claim 9, wherein
the valve member is moved to the valve opening position, when the pressure of the gas in the annular fluid passage becomes higher than a predetermined value, and
the pressure control portion carries out a liquid discharging control during the valve member is in the valve closing position, according to which
the gas supply unit is so controlled that the gas having a pressure lower than the predetermined value is supplied to the fluid injection device,
the gas flowing in the annular fluid passage is supplied to the communication port and the inside passage, and
the liquid is discharged from the communication port and the inside passage to an outside liquid tank, which is located at an outside of the fluid injection device.

11. The fluid injection system according to claim 10, further comprising;
a flow rate detecting portion for detecting a flow rate of the gas supplied to the fluid injection device,
wherein the pressure control portion determines during the liquid discharging control that the gas has reached the outside liquid tank, when the pressure control portion detects that the flow rate of the gas detected by the flow rate detecting portion is increased, and
the pressure control portion terminates the liquid discharging control, when it determines that the gas has reached the outside liquid tank.

12. The fluid injection system according to claim 10, further comprising;
a pump-out load detecting portion for detecting a pump-out load of the gas supply unit for the gas to be supplied to the fluid injection device,
wherein the pressure control portion determines during the liquid discharging control that the gas has reached the outside liquid tank, when the pump-out load for the gas detected by the pump-out load detecting portion is increased, and
the pressure control portion terminates the liquid discharging control, when it determines that the gas has reached the outside liquid tank.

13. The fluid injection system according to claim 9, wherein
the valve member is moved to the valve opening position, when the pressure of the gas in the annular fluid passage becomes higher than a predetermined value, and
the pressure control portion carries out a liquid sucking control, when starting a liquid injection operation of the fluid injection device and when the inside passage and the communication port of the fluid injection device are not filled with the liquid, in such a way;

the gas supply unit is controlled to supply the gas having a pressure higher than the predetermined value to the fluid injection device, negative pressure is generated in the annular fluid passage at an opening portion, at which the communication port is opened to the annular fluid passage, and the liquid is sucked from an outside liquid tank to the annular fluid passage at the opening portion, at which the communication port is opened to the annular fluid passage.

14. The fluid injection system according to claim 13, further comprising;

a flow rate detecting portion for detecting a flow rate of the gas supplied to the fluid injection device, wherein the pressure control portion determines during the liquid sucking control that the liquid has reached the opening portion of the communication port, when the pressure control portion detects that the flow rate of the gas detected by the flow rate detecting portion is decreased, the pressure control portion terminates the liquid sucking control, when it determines that the liquid has reached the opening portion of the communication port, and the pressure control portion determines that a preparation for injecting the gas and the liquid is completed.

15. The fluid injection system according to claim 13, further comprising;

a pump-out load detecting portion for detecting a pump-out load of the gas supply unit for the gas to be supplied to the fluid injection device, wherein the pressure control portion determines during the liquid sucking control that the liquid has reached the opening portion of the communication port, when the pump-out load for the gas detected by the pump-out load detecting portion is decreased, the pressure control portion terminates the liquid sucking control, when it determines that the liquid has reached the opening portion of the communication port, and the pressure control portion determines that a preparation for injecting the gas and the liquid is completed.

16. The fluid injection system according to claim 9, wherein urea aqueous solution is used as the liquid to be injected from the fluid injection device, air is used as the gas to be supplied to the fluid injection device, and the fluid injection device is composed of an adding valve for adding the urea aqueous solution to exhaust gas passing through an exhaust pipe of a vehicle.

17. The fluid injection system according to claim 9, further comprising;

a sub fuel tank provided in a fuel pipe connecting a common rail to a main fuel tank, wherein a leak fuel returns from the common rail to the main fuel tank through the fuel pipe and the leak fuel is temporarily stored in the sub fuel tank, the fuel stored in the sub fuel tank is used as the liquid to be injected from the fluid injection device, air is used as the gas to be supplied to the fluid injection device, and the fluid injection device is composed of an adding valve for adding the fuel to exhaust gas passing through an exhaust pipe of a vehicle.

18. A fluid injection device comprising;

a valve body of a cylindrical shape, which has a cylindrical accommodation space and an injection port at an axial forward end thereof, the valve body having a valve seat portion around the injection port;

a valve member movably accommodated in the cylindrical accommodation space and having a valve surface portion at a forward end thereof, wherein the valve surface portion is operatively seated on the valve seat portion of the valve body when the valve member is in a valve closing position, while the valve surface portion is operatively separated from the valve seat portion of the valve body when the valve member is in a valve opening position, and wherein the valve member has an inside passage extending in the axial direction and a communication port for communicating the inside passage to an outside of the valve member, so that liquid flows through the inside passage and the communication port to the outside of the valve member when the valve member is in the valve opening position;

an annular fluid passage formed between an inner peripheral surface of the valve body and an outer peripheral surface of the valve member, so that the annular fluid passage is communicated to the inside passage of the valve member through the communication port, wherein gas flows in the axial direction through the annular fluid passage to the injection port when the valve member is in the valve opening position;

wherein one end of the communication port is opened to the annular fluid passage at a position which is on an upstream side of the valve surface portion in a flow direction of the gas flowing along the axial direction of the valve member, wherein the liquid supplied to the annular fluid passage through the communication port is injected from the injection port together with the gas flowing through the annular fluid passage, when the valve member is in the valve opening position, and injection of the liquid and the gas is terminated when the valve member is moved to the valve closing position, wherein a cross-sectional passage area of a connecting passage portion of the annular fluid passage is smaller than a cross-sectional passage area of an upstream-side passage portion of the annular fluid passage, wherein the connecting passage portion is a portion of the annular fluid passage, at which the communication port is connected to the annular fluid passage, and wherein the upstream-side passage portion is another portion of the annular fluid passage, which is located at an upstream side of the connecting passage portion.

19. A method for operating the fluid injection device according to claim 18 comprising;

a step for carrying out a liquid sucking control in a condition that the valve member is in the valve opening position in such a way that;

the gas having a pressure of a first preset value is supplied from the gas-supply unit to the fluid injection device, so that the gas is injected through the injection port and thereby negative pressure is generated in the connecting passage portion, and the liquid is sucked by the negative pressure from a liquid tank, which is located at an outside of the fluid injection device, to the communication port, so that an injection of the liquid is prepared;

a step for carrying out a liquid injection control in such a way that;

the gas having the pressure of the first preset value is supplied to the fluid injection device, the liquid is sucked by the gas having the pressure of the first preset value, from the communication port to the annular fluid passage, and the liquid is injected from the injection port together with the gas;

a step for carrying out a liquid discharging control when stopping an injection operation of the fluid injection device, in such a way that;

the gas having a pressure of a second preset value is supplied from the gas-supply unit to the fluid injection device, wherein the second preset value is lower than the first preset value, and wherein the valve member is not moved to the valve opening position by the gas having the pressure of the second present value, and the liquid remaining in the fluid injection device is returned to the liquid tank by the gas having the pressure of the second preset value; and a step for carrying out a gas-supply terminating control in such a way that gas supply from the gas supply unit to the fluid injection device is terminated after the liquid discharging control.

\* \* \* \* \*